US010005195B2

(12) United States Patent
Suzuki

(10) Patent No.: US 10,005,195 B2
(45) Date of Patent: Jun. 26, 2018

(54) CORRUGATED PAPERBOARD CUTTING CONTROL APPARATUS AND CORRUGATED PAPERBOARD CUTTING CONTROL METHOD

(71) Applicant: KABUSHIKI KAISHA ISOWA, Nagoya-shi, Aichi (JP)

(72) Inventor: Michio Suzuki, Komaki (JP)

(73) Assignee: KABUSHIKI KAISHA ISOWA, Aichi (JP)

(*) Notice: Subject to any disclaimer, the term of this patent is extended or adjusted under 35 U.S.C. 154(b) by 915 days.

(21) Appl. No.: 14/489,158

(22) Filed: Sep. 17, 2014

(65) Prior Publication Data
US 2015/0088296 A1 Mar. 26, 2015

(30) Foreign Application Priority Data

Sep. 20, 2013 (JP) ................................. 2013-196127

(51) Int. Cl.
B26D 5/00 (2006.01)
B26D 5/20 (2006.01)
(Continued)

(52) U.S. Cl.
CPC ............ B26D 5/007 (2013.01); B26D 1/626 (2013.01); B26D 5/20 (2013.01); G05B 15/02 (2013.01); B26D 2007/2692 (2013.01)

(58) Field of Classification Search
CPC .. B31B 2217/0084; B26D 5/007; B26D 5/20; B26D 5/34; B26D 1/626;
(Continued)

(56) References Cited

U.S. PATENT DOCUMENTS 4,221,143 A * 9/1980 Ritter .................... B21F 33/005
83/295
6,032,713 A * 3/2000 Ishibuchi .............. B31F 1/2813
156/205

(Continued)

FOREIGN PATENT DOCUMENTS

JP 3749755 B2 3/2006
JP 2010-142988 A 7/2010

Primary Examiner — M. N. Von Buhr
(74) Attorney, Agent, or Firm — Brinks Gilson & Lione

(57) ABSTRACT

Disclosed are a corrugated paperboard cutting control apparatus and a corrugated paperboard cutting control method. Under control of a cutter control device (110), a camera (CA) images a flute arrangement state in a cut section LE of a corrugated paperboard after being cut. A lower-level management device (100) acquires a result of the imaging from the camera. Then, the lower-level management device performs: a phase determining processing of, based on the acquired imaging result, determining a flute arrangement phase located at an actual cut position within one flute pitch; a directive sheet length setting processing of adjusting a preset order-specified sheet length (L) in such a manner as to allow the flute arrangement phase determined through the phase determining processing to come closer to a preset reference flute arrangement phase, to thereby set a directive sheet length (Ln) having a value equal to an integral multiple of the flute pitch; and an instructing processing of giving an instruction to designate the directive sheet length set through the directive sheet length setting processing, to a cutting apparatus.

10 Claims, 18 Drawing Sheets

(51) Int. Cl.
 *G05B 15/02* (2006.01)
 *B26D 1/62* (2006.01)
 *B26D 7/26* (2006.01)
(58) Field of Classification Search
 CPC ........ B26D 2007/2692; B26D 2210/00; B65H 2301/5151; B65H 23/046; B65H 2553/42; B65H 35/06; G05B 2219/50074; G05B 19/40931; G05B 15/02
 USPC .......................................................... 493/59
 See application file for complete search history.

(56) References Cited

U.S. PATENT DOCUMENTS

| | | | |
|---|---|---|---|
| 2015/0053349 A1* | 2/2015 | Mori ..................... | B31F 1/2836 156/355 |
| 2016/0271897 A1* | 9/2016 | Greenfield ............... | B31F 1/08 |

* cited by examiner

FIG.26
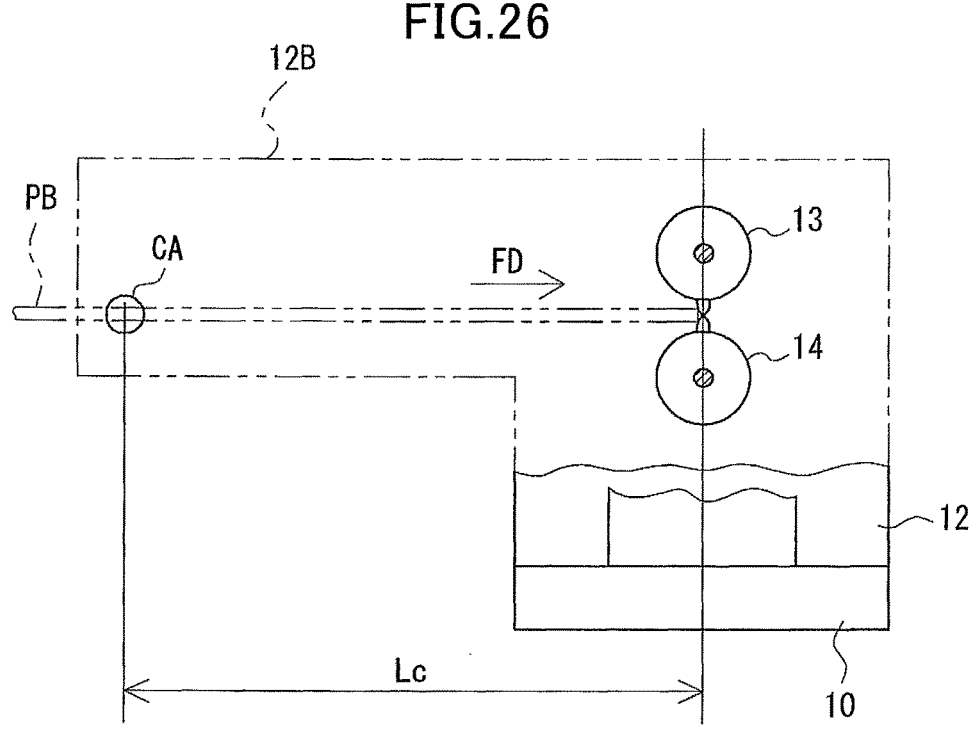
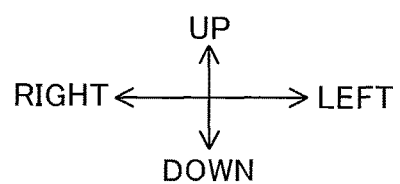

CORRUGATED PAPERBOARD CUTTING CONTROL APPARATUS AND CORRUGATED PAPERBOARD CUTTING CONTROL METHOD

RELATED APPLICATIONS

This application claims priority under 35 U.S.C. § 119 to Japanese Patent Application No. 2013-196127 filed on Sep. 20, 2013, the entire content of which is hereby incorporated by reference.

BACKGROUND OF THE INVENTION

1. Field of the Invention

The present invention relates to a cutting control system for cutting a corrugated paperboard (continuous corrugated paperboard web) based on a directive sheet length preliminarily set on a per-order basis (hereinafter referred to as "preset order-specified sheet length"). More specifically, the present invention relates to a cutting control system designed to adjust a preset order-specified sheet length, depending on a flute pitch preliminarily set on a per-order basis, in such a manner as to reduce a variation in arrangement state of corrugated flutes in a cut cross-section of a corrugated paperboard sheet.

2. Description of the Related Art

Heretofore, in a corrugating machine, there has been known a cutting apparatus for cutting a corrugated paperboard (continuous corrugated paperboard web) according to a preset order-specified sheet length. For example, a cutting apparatus described in JP 3749755 B (Patent Document 1) comprises a pair of knife cylinders, wherein it is configured to variably control a rotational speed of the knife cylinders according to a preset order-specified sheet length. Through this variable control, it is possible to cut a corrugated paperboard into corrugated paperboard sheets each having a length compliant with each of a plurality of different directive sheet lengths.

Each of the corrugated paperboard sheets cut by the cutting apparatus is subjected to various processings using a corrugated paperboard box making machine. For example, a corrugated paperboard box making machine described in JP 2010-142988 A (Patent Document 2) comprises a creaser unit for subjecting a corrugated paperboard sheet to creasing. The creaser unit is configured to form a plurality of crease lines in a corrugated paperboard sheet which is being conveyed in a posture where a direction along which each corrugated flute thereof extends (flute direction) is oriented in a conveyance direction (machine direction). Subsequently, the corrugated paperboard sheet is bent along each of the crease lines.

SUMMARY OF THE INVENTION

Meanwhile, a corrugated paperboard sheet has a flute pitch which varies depending on a flute type preliminarily set on a per-order basis. Generally, A-flute has a flute pitch of 8.8 mm, and B-flute has a flute pitch of 6.0 mm. Further, the corrugated paperboard sheet has a length according to a preset order-specified sheet length, in a direction crossing a flute direction. The preset order-specified sheet length is set independently of a flute pitch. That is, it is common that the directive sheet length is set to a value different from a length equal to an integral multiple of the flute pitch or an integral multiple of one-half of the flute pitch.

For example, suppose that the flute pitch of the corrugated paperboard sheet is set to 6.0 mm which is a flute pitch of B-flute, and the directive sheet length is set to 601 mm, i.e., the directive sheet length has a dimensional difference of 1 mm with respect to 600 mm which is a length equal to an integral multiple of the flute pitch. In this case, when a rear edge of a downstreammost corrugated paperboard sheet is cut by a cutting apparatus, at a position offset from a flute trough (root) by an initial dimensional difference of 1 mm, a rear edge of a second-downstream corrugated paperboard sheet is cut by the cutting apparatus, at a position offset from a flute trough by 2 mm which is two times greater than the initial dimensional difference. That is, a rear edge of an Nth-downstreammost corrugated paperboard sheet is cut by the cutting apparatus, at a position offset from a flute trough by N mm which is N times greater than the initial dimensional difference. As a result, even in the same order, an arrangement state of flute troughs and ridges (tips) varies in each corrugated paperboard sheet cut by the cutting apparatus.

A creaser unit is configured to form crease lines in the corrugated paperboard sheet, at given creasing positions set on a per-order basis. However, due to a variation in arrangement state of flute troughs and ridges in each corrugated paperboard sheet cut by the cutting apparatus, an arrangement state of flute troughs and ridges at each creasing position also varies in each corrugated paperboard sheet. This causes a problem that a state of bending along the crease lines varies in each corrugated paperboard sheet, resulting in quality deterioration of the bent corrugated paperboard sheets.

It is therefore an object of the present invention to provide a corrugated paperboard cutting control system capable of reducing a variation in arrangement state of flute troughs and ridges of a corrugated paperboard sheet.

First Aspect of Present Invention and Specific Embodiment Thereof

In order to achieve the above object, according to a first aspect of the present invention, there is provided a corrugated paperboard cutting control apparatus for instructing a cutting apparatus to perform a cutting operation based on a directive sheet length, wherein the corrugated paperboard comprises a corrugated medium with flutes formed at given flute pitches to have flute ridges and troughs, and the cutting apparatus is operable, when the corrugated paperboard is conveyed in a conveyance direction crossing a direction along which each of the flute ridges or troughs extends, to cut the corrugated paperboard in a direction perpendicular to the conveyance direction. The corrugated paperboard cutting control apparatus comprises: a detection section configured to detect a flute arrangement state at an actual cut position of the corrugated paperboard cut by the cutting apparatus, or a presumptive cut position of the corrugated paperboard to be cut by the cutting apparatus; and a managerial control section configured to acquire a result of the detection in the detection section, wherein the managerial control section is operable, based on the detection result in the detection section, to determine a flute arrangement phase in one flute pitch of the corrugated paper board to be located at the actual cut position or the presumptive cut position, and then to adjust a preset order-specified sheet length in such a manner as to allow the determined flute arrangement phase to come closer to a preset reference flute arrangement phase, to thereby set a directive sheet length having a value equal to an integral multiple of the flute pitch or an integral multiple of one-half of the flute pitch, and give an instruction to designate the directive sheet length to the cutting apparatus.

In the first aspect of the present invention, an actual cut position of the corrugated paperboard to be cut by the cutting apparatus is not limited to a position of the flute ridge or trough, but may be a position away from the flute ridge or trough by a given distance.

In the first aspect of the present invention, it is only necessary for the detection section to be configured to detect a flute arrangement state at the actual cut position or the presumptive cut position. For example, as the detection section, it is possible to use an optical detection device such as a camera for imaging flutes, and an ultrasonic detection device for detecting the flute arrangement state based on an amount of reflection of ultrasonic waves emitted to the corrugated paperboard.

In the first aspect of the present invention, on an assumption that one flute pitch is measured on the basis of the troughs as a distance between one trough and the next trough, the flute arrangement phase located at the actual cut position or the presumptive cut position is indicative of a distance from one trough located immediately upstream of the actual cut position or the presumptive cut position, to the actual cut position or the presumptive cut position. Further, on an assumption that one flute pitch is measured on the basis of the troughs, the preset reference flute arrangement phase is indicative of a preset distance from one trough toward the next trough.

In the first aspect of the present invention, the detection section is operable to detect the flute arrangement state at the actual cut position or the presumptive cut position. Then, the managerial control section is operable, based on a result of the detection in the detection section, to determine a flute arrangement phase in one flute pitch to be located at the actual cut position or the presumptive cut position, and then to adjust the preset order-specified sheet length in such a manner as to allow the determined flute arrangement phase to come closer to the preset reference flute arrangement phase, to thereby set a directive sheet length having a value equal to an integral multiple of the flute pitch or an integral multiple of one-half of the flute pitch. Thus, the flute arrangement phase located at the actual cut position or the presumptive cut position can be adjusted to come closer to the preset reference flute arrangement phase, so that a length of a corrugated paperboard sheet cut by the cutting apparatus comes closer to a value equal to an integral multiple of the flute pitch or an integral multiple of one-half of the flute pitch. This makes it possible to reduce a variation in arrangement state of flute troughs and ridges in each corrugated paperboard sheet.

Preferably, in the first aspect of the present invention, the managerial control section is further operable, according to: a first comparison result between a remainder as a result of dividing the preset order-specified sheet length by the flute pitch or a value obtained by subtracting the remainder from the flute pitch, and a dimensional error allowable value of a corrugated paperboard sheet determined based on a flute type; and a second comparison result between an absolute value of a value obtained by subtracting the remainder from one-half of the flute pitch, and the dimensional error allowable value, to select one of a plurality of modes comprising at least a first mode of setting the directive sheet length to a value of an integral multiple of the flute pitch, and a second mode of setting the directive sheet length to a value of an integral multiple of one-half of the flute pitch, and, according to the selected mode, to set the directive sheet length.

In this preferred embodiment, the remainder as the result of dividing the preset order-specified sheet length by the flute pitch may be preliminarily stored in a storage section in associated relation with a corresponding order, or may be calculated by a calculation processing of dividing the preset order-specified sheet length by the flute pitch.

In this preferred embodiment, the corrugated paperboard sheet dimensional error allowable value a may be determined based on at least the flute type, or may be determined while taking into account other factor, such as a thickness of a raw paperboard, together with the flute type.

In this preferred embodiment, the number of selectable modes when setting the directive sheet length is determined depending on the flute pitch and the corrugated paperboard sheet dimensional error allowable value, and it is only necessary that one of the first mode and the second mode is selectable. In the case where the flute pitch is relatively small, or the dimensional error allowable value is relatively large, the control apparatus may be configured to have only the two modes: the first and second modes. On the other hand, in the case where the flute pitch is relatively large, or the dimensional error allowable value is relatively small, the control apparatus is configured to have a third mode of setting the preset order-specified sheet length as the directive sheet length, in addition to the first and second modes.

In this preferred embodiment of the first aspect of the present invention, the managerial control section is operable, according to the first comparison result and the second comparison result, to select one of a plurality of modes comprising at least the first mode and the second mode. Then, a directive sheet length setting processing operates to set the directive sheet length according to the mode selected by a mode selecting processing. Thus, when the first mode or the second mode is selected, a length of a corrugated paperboard sheet cut by the cutting apparatus comes closer to a value equal to an integral multiple of the flute pitch or an integral multiple of one-half of the flute pitch. This makes it possible to reduce a variation in arrangement state of flute troughs and ridges in each corrugated paperboard sheet.

Preferably, in the first aspect of the present invention, the managerial control section is capable of, in addition to the first and second modes, selecting a third mode of setting the preset order-specified sheet length as the directive sheet length, and wherein the managerial control section is operable, according to the first comparison result and the second comparison result, to select one of the first to third modes.

In this preferred embodiment of the first aspect of the present invention, the managerial control section is operable, according to the first comparison result and the second comparison result, to select one of the first to third modes. Thus, when the third mode is selected, the corrugated paperboard is cut according to the preset order-specified sheet length. This makes it possible to prevent the preset order-specified sheet length from being largely changed beyond the dimensional error allowable value.

Preferably, in the first aspect of the present invention, during selection of one of the first to third mode, the managerial control section is operable: when it is determined that the remainder as the result of dividing the preset order-specified sheet length by the flute pitch or the value obtained by subtracting the remainder from the flute pitch is equal to or less than the dimensional error allowable value, to select the first mode; when it is determined that the absolute value of the value obtained by subtracting the remainder from one-half of the flute pitch is equal to or less than the dimensional error allowable value, to select the second mode; and when it is determined that the remainder as the result of dividing the preset order-specified sheet length by the flute pitch or the value obtained by subtracting the remainder from the flute pitch is greater than the dimensional error allowable value and further the absolute value of the value obtained by subtracting the remainder from one-half of the flute pitch is greater than the dimensional error allowable value, to select the third mode.

In this preferred embodiment, any one of the comparative determination on the relationship between the dimensional error allowable value and the remainder as the result of dividing the preset order-specified sheet length by the flute pitch or the value obtained by subtracting the remainder from the flute pitch, and the comparative determination on the relationship between the dimensional error allowable value and the absolute value of the value obtained by subtracting the remainder from one-half of the flute pitch, may be performed earlier.

In this preferred embodiment of the first aspect of the present invention, during the mode selection, the managerial control section is operable: when it is determined that the remainder as the result of dividing the preset order-specified sheet length by the flute pitch or the value obtained by subtracting the remainder from the flute pitch is equal to or less than the dimensional error allowable value, to select the first mode; and, when it is determined that the absolute value of the value obtained by subtracting the remainder from one-half of the flute pitch is equal to or less than the dimensional error allowable value, to select the second mode. The managerial control section is also operable, when it is determined that the remainder as the result of dividing the preset order-specified sheet length by the flute pitch or the value obtained by subtracting the remainder from the flute pitch is greater than the dimensional error allowable value and further the absolute value of the value obtained by subtracting the remainder from one-half of the flute pitch is greater than the dimensional error allowable value, to select the third mode. Thus, when the preset order-specified sheet length deviates from a value equal to an integral multiple of the flute pitch or an integral multiple of one-half of the flute pitch, within the dimensional error allowable value, the corrugated paperboard is cut under a condition that the directive sheet length is set to come closer to a value equal to an integral multiple of the flute pitch or an integral multiple of one-half of the flute pitch. This makes it possible to reliably reduce a variation in arrangement state of flute troughs and ridges in each corrugated paperboard sheet. On the other hand, when the preset order-specified sheet length largely deviates from a value equal to an integral multiple of the flute pitch or an integral multiple of one-half of the flute pitch, beyond the dimensional error allowable value, the corrugated paperboard is cut according to the preset order-specified sheet length. This makes it possible to reliably prevent the preset order-specified sheet length from being largely changed beyond the dimensional error allowable value.

Preferably, in the first aspect of the present invention, during setting of the directive sheet length, the managerial control section is operable: when the first mode is selected, to adjust the preset order-specified sheet length in such a manner as to allow the determined flute arrangement phase to come closer to the preset reference flute arrangement phase, to thereby set a directive sheet length having a value equal to an integral multiple of the flute pitch; when the second mode is selected, to adjust the preset order-specified sheet length in such a manner as to allow the determined flute arrangement phase to come closer to each of the preset reference flute arrangement phase and a phase offset from the preset reference flute arrangement phase by one-half of the flute pitch, which are alternately switched therebetween during repetition of the directive sheet length setting operation, to thereby set a directive sheet length having a value equal to an integral multiple of one-half of the flute pitch.

In this preferred embodiment of the first aspect of the present invention, the managerial control section is operable, when the first mode is selected, to adjust the preset order-specified sheet length in such a manner as to allow the determined flute arrangement phase to come closer to the preset reference flute arrangement phase, to thereby set a directive sheet length having a value equal to an integral multiple of the flute pitch. The managerial control section is also operable, when the second mode is selected, to adjust the preset order-specified sheet length in such a manner as to allow the determined flute arrangement phase to come closer to each of the preset reference flute arrangement phase and a phase offset from the preset reference flute arrangement phase by one-half of the flute pitch, which are alternately switched therebetween during repetition of the directive sheet length setting operation, to thereby set a directive sheet length having a value equal to an integral multiple of one-half of the flute pitch. Thus, even when either one of the first mode and the second mode is selected, the corrugated paperboard can be cut in such a manner as to allow the flute arrangement phase located at the actual cut position or the presumptive cut position to come close to the preset reference flute arrangement phase or the phase offset from the preset reference flute arrangement phase by one-half of the flute pitch. This makes it possible to reliably reduce a variation in arrangement state of flute troughs and ridges in each corrugated paperboard sheet.

Preferably, in the first aspect of the present invention, when a crease line is formed in a corrugated paperboard sheet along flute troughs thereof, the reference flute arrangement phase is preliminarily set according to a distance from an edge of a corrugated paperboard sheet to a nearest trough in the conveyance direction.

In this preferred embodiment of the first aspect of the present invention, the reference flute arrangement phase is set according to a distance between a position of a crease line to be formed in a corrugated paperboard sheet and an edge of the corrugated paperboard sheet. Thus, the reference flute arrangement phase is a phase where the flute ridge or trough is located, or may be an intermediate phase between adjacent trough and ridge.

Preferably, in the first aspect of the present invention, when a corrugated paperboard sheet obtained through the cutting operation is subjected to creasing to form a crease line extending along flute troughs of the corrugated paperboard sheet, the reference flute arrangement phase is preliminarily set according to a distance from an edge of the corrugated paperboard sheet to a nearest one of the flute troughs to the edge, in the conveyance direction. This makes it possible to cut the corrugated paper board in such a manner as to allow the flute trough to be located at a position where a crease line is to be formed.

Preferably, in the first aspect of the present invention, the reference flute arrangement phase is a phase where the flute ridge or trough is located, within one flute pitch.

In this preferred embodiment of the first aspect of the present invention, the reference flute arrangement phase a phase where the flute ridge or trough is located, within one flute pitch, so that a flute arrangement state in each corrugated paperboard sheet can be uniformed. This makes it possible to eliminate a need for turning corrugated paperboard sheets back to front with respect to the conveyance direction, in a corrugated paperboard sheet stacking process.

Preferably, in the first aspect of the present invention, the detection section is disposed at a given position with respect to an installation position of the cutting apparatus, in the conveyance direction of the corrugated paperboard, and configured to image a given region of the corrugated paperboard located at the actual cut position or the presumptive cut position, in synchronization with the cutting operation of the cutting apparatus, and the managerial control section is operable, based on an image obtained by the detection section, to determine the flute arrangement phase located at the actual cut position or the presumptive cut position.

In this preferred embodiment of the first aspect of the present invention, the given position at which the detection section is disposed is a position away from an installation position of the cutting device, irrespective of a type of flute and a type of raw paperboard. This given distance may be set to ensure a time required for, after the detection section starts the detection operation, completing setting of a directive sheet length based on the detection result and controlling cutting of the corrugated paperboard, and to allow the detection section to be located possibly close to the installation position of the cutting apparatus.

In this preferred embodiment, the given region of the corrugated paperboard to be imaged by the detection section may be set to reliably include a nearest one of the flutes or ridges located upstream with respect to the actual cut position or the presumptive cut position of the corrugated paperboard.

Preferably, in the first aspect of the present invention, the detection section is disposed at a given position with respect to an installation position of the cutting apparatus, in the conveyance direction of the corrugated paperboard, and configured to image a given region of the corrugated paperboard located at the actual cut position or the presumptive cut position, in synchronization with the cutting operation of the cutting apparatus. The managerial control section is operable, based on an image obtained by the detection section, to determine the flute arrangement phase located at the actual cut position or the presumptive cut position. This makes it possible to reliably image a given region of the corrugated paperboard located at the actual cut position or the presumptive cut position, and accurately determine the flute arrangement phase located at the actual cut position or the presumptive cut position.

Preferably, in the first aspect of the present invention, the managerial control section is operable, when the first mode or the second mode is selected, to compare a conveyance-directional distance equivalent to a difference between the determined flute arrangement phase or a phase obtained by adding one flute pitch to the determined flute arrangement phase, and the preset reference flute arrangement phase, to the value of one-half of the flute pitch, and, according to a result of the comparison, to perform an adjustment of increasing the preset order-specified sheet length, or an adjustment of reducing the preset order-specified sheet length.

In this preferred embodiment, in each of the first and second modes, the adjustment of increasing the preset order-specified sheet length, or the adjustment of reducing the preset order-specified sheet length may be performed in a total different manner, or may be performed in partially the same manner.

In this preferred embodiment of the first aspect of the present invention, when the determined flute arrangement phase is greater than the preset flute arrangement phase, the managerial control section uses, as a comparative reference, a conveyance-directional distance equivalent to a difference obtained by subtracting the preset reference flute arrangement phase from the determined flute arrangement phase. On the other hand, when the determined flute arrangement phase is less than the preset flute arrangement phase, the managerial control section uses, as a comparative reference, a conveyance-directional distance equivalent to a difference obtained by subtracting the preset reference flute arrangement phase from a phase obtained by adding one flute pitch to the determined flute arrangement phase.

Preferably, in the first aspect of the present invention, the managerial control section is operable, when the first mode or the second mode is selected, to compare a conveyance-directional distance equivalent to a difference between the determined flute arrangement phase or a phase obtained by adding one flute pitch to the determined flute arrangement phase, and the preset reference flute arrangement phase, to the value of one-half of the flute pitch, and, according to a result of the comparison, to perform an adjustment of increasing the preset order-specified sheet length, or an adjustment of reducing the preset order-specified sheet length. Based on the adjustment of increasing the preset order-specified sheet length, or the adjustment of reducing the preset order-specified sheet length, it becomes possible to allow the flute arrangement phase located at the actual cut position or the presumptive cut position to come closer to the preset flute arrangement phase, thereby reliably reducing a variation in arrangement state of flute troughs and ridges in each corrugated paperboard sheet.

Preferably, in the first aspect of the present invention, in a situation where the first mode is selected, the managerial control section is operable, when the conveyance-directional distance equivalent to the difference between the determined flute arrangement phase or the phase obtained by adding one flute pitch to the determined flute arrangement phase, and the preset reference flute arrangement phase, is less than the value of one-half of the flute pitch, to perform a first increasing adjustment of increasing the preset order-specified sheet length, and, when the conveyance-directional distance equivalent to the difference is equal to or greater than the value of one-half of the flute pitch, to perform a first reducing adjustment of reducing the preset order-specified sheet length.

Preferably, in the first aspect of the present invention, in a situation where the first mode is selected, the managerial control section is operable, when the conveyance-directional distance equivalent to the difference between the determined flute arrangement phase or the phase obtained by adding one flute pitch to the determined flute arrangement phase, and the preset reference flute arrangement phase, is less than the value of one-half of the flute pitch, to perform the first increasing adjustment, and, when the conveyance-directional distance equivalent to the difference is equal to or greater than the value of one-half of the flute pitch, to perform the first reducing adjustment. Thus, based on the first increasing adjustment and the first reducing adjustment, a directive sheet length can be set to a value closer to an integral multiple of the flute pitch, thereby reliably reducing a variation in arrangement state of flute troughs and ridges in each corrugated paperboard sheet.

Preferably, in the first aspect of the present invention, in a situation where the second mode is selected, the managerial control section is operable, when the conveyance-directional distance equivalent to the difference between the determined flute arrangement phase or the phase obtained by adding one flute pitch to the determined flute arrangement phase, and the preset reference flute arrangement phase, is less than the value of one-half of the flute pitch, to alternately perform, during repetition of the directive sheet length setting operation, the first increasing adjustment of increasing the preset order-specified sheet length, or a second reducing adjustment of reducing the preset order-specified sheet length in a different manner from the first reducing adjustment, and, when the conveyance-directional distance equivalent to the difference is equal to or greater than the value of one-half of the flute pitch, to alternately perform, during repetition of the directive sheet length setting operation, the first reducing adjustment of reducing the preset order-specified sheet length, or a second increasing adjustment of increasing the preset order-specified sheet length in a different manner from the first increasing adjustment.

In this preferred embodiment of the first aspect of the present invention, in the first aspect of the present invention, in a situation where the second mode is selected, the managerial control section is operable, when the conveyance-directional distance equivalent to the difference between the determined flute arrangement phase or the phase obtained by adding one flute pitch to the determined flute arrangement phase, and the preset reference flute arrangement phase, is less than the value of one-half of the flute pitch, to alternately perform, during repetition of the directive sheet length setting operation, the first increasing adjustment, or the second reducing adjustment, and, when the conveyance-directional distance equivalent to the difference is equal to or greater than the value of one-half of the flute pitch, to alternately perform, during repetition of the directive sheet length setting operation, the first reducing adjustment, or the second increasing adjustment. Thus, based on alternately performing the first increasing adjustment and the second reducing adjustment, or alternately performing the first reducing adjustment and the second increasing adjustment, a directive sheet length can be set to a value closer to an integral multiple of one-half of the flute pitch, thereby reliably reducing a variation in arrangement state of flute troughs and ridges in each corrugated paperboard sheet.

(Second Aspect of Present Invention)

In order to achieve the above object, according to a second aspect of the present invention, there is provided a corrugated paperboard cutting control method for instructing a cutting apparatus to perform a cutting operation based on a directive sheet length, wherein the corrugated paperboard comprises a corrugated medium with flutes formed at given flute pitches to have flute ridges and troughs, and the cutting apparatus is operable, when the corrugated paperboard is conveyed in a conveyance direction crossing a direction along which each of the flute ridges or troughs extends, to cut the corrugated paperboard in a direction perpendicular to the conveyance direction. The corrugated paperboard cutting control method comprises: a detection step of detecting a flute arrangement state at an actual cut position of the corrugated paperboard cut by the cutting apparatus, or a presumptive cut position of the corrugated paperboard to be cut by the cutting apparatus; a phase determination step of, based on a result of the detection in the detection step, determining a flute arrangement phase in one flute pitch of the corrugated paper board to be located at the actual cut position or the presumptive cut position; a directive sheet length setting step of adjusting a preset order-specified sheet length in such a manner as to allow the flute arrangement phase determined in the phase determination step to come closer to a preset reference flute arrangement phase, to thereby set a directive sheet length having a value equal to an integral multiple of the flute pitch or an integral multiple of one-half of the flute pitch; and an instructing step of giving an instruction to designate the directive sheet length set in the directive sheet length setting step, to the cutting apparatus.

In the second aspect of the present invention, the detection step is configured to detect a flute arrangement state at an actual cut position of the corrugated paperboard cut by the cutting apparatus, or a presumptive cut position of the corrugated paperboard to be cut by the cutting apparatus. The phase determination step is configured to, based on a result of the detection in the detection step, determine a flute arrangement phase in one flute pitch of the corrugated paper board to be located at the actual cut position or the presumptive cut position. The directive sheet length setting step is configured to adjust a preset order-specified sheet length in such a manner as to allow the flute arrangement phase determined in the phase determination step to come closer to a preset reference flute arrangement phase, to thereby set a directive sheet length having a value equal to an integral multiple of the flute pitch or an integral multiple of one-half of the flute pitch. Thus, the flute arrangement phase located at the actual cut position or the presumptive cut position can be adjusted to come closer to the preset reference flute arrangement phase, so that a length of a corrugated paperboard sheet cut by the cutting apparatus comes closer to a value equal to an integral multiple of the flute pitch or an integral multiple of one-half of the flute pitch. This makes it possible to reduce a variation in arrangement state of flute troughs and ridges in each corrugated paperboard sheet.

BRIEF DESCRIPTION OF THE DRAWINGS

FIG. 26 is an explanatory diagram illustrating an installation position of a camera CA in a cutoff system according to a third embodiment of the present invention.

DETAILED DESCRIPTION OF THE PREFERRED EMBODIMENTS

First Embodiment

With reference to the drawings, the present invention will now be described based on a first embodiment thereof in which a corrugated paperboard cutting control apparatus of the present invention is applied to a cutoff system for a corrugating machine. A corrugating machine having a cutoff system is well-known as disclosed in JP 2009-160797 A and others. Thus, description of the entire corrugating machine will be omitted and only the cutoff system related to the present invention will be described below. In the figures, an up-down direction, a right-left direction and a front-rear direction are defined according to respective directions indicated by the arrowed lines.

<<General Configuration>>

Figure 1:
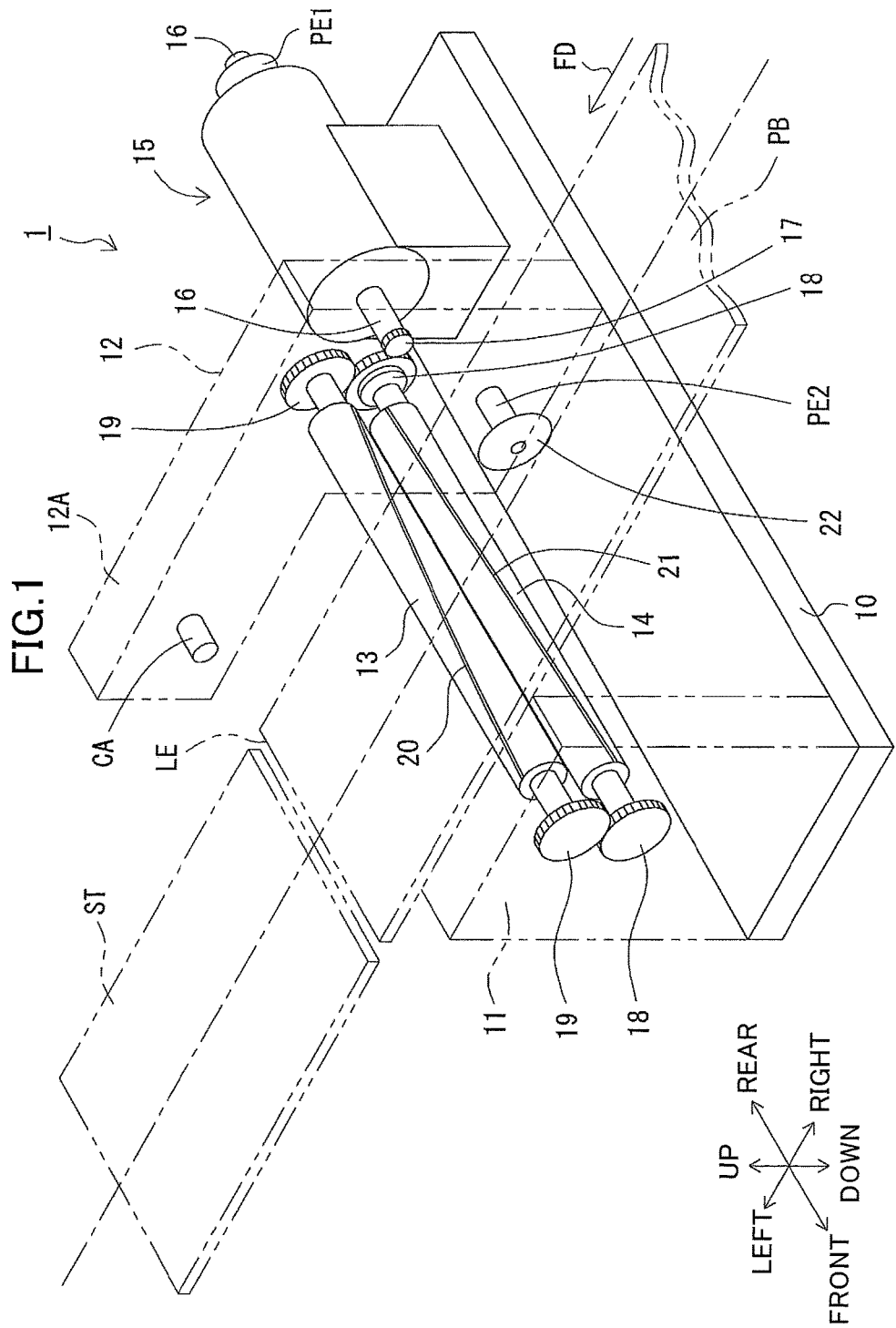
FIG. 1 is a perspective view illustrating a general configuration of a cutoff system according to one embodiment of the present invention.

FIG. 1 illustrates a general configuration of a cutoff system 1 according to this embodiment. The cutoff system 1 is designed to cut a corrugated paperboard PB subjected to slotting and scoring by a slitter-scorer, into a corrugated paperboard sheet ST having a given length. The corrugated paperboard PB is conveyed in a conveyance direction FD directed from a right side toward a left side along a conveyance path by a heretofore-known conveyance device.

In FIG. 1, the cutoff system 1 comprises a base 10 and front and rear support frames 11, 12 disposed in opposed relation in a front-rear direction. The front and rear support frames 11, 12 rotatably support, respectively, front and rear ends of each of an upper knife cylinder 13 and a lower knife cylinder 14, in such a manner that the upper and lower knife cylinders 13, 14 extend parallel to each other in the front-rear direction while being arranged one above the other. The base 10 is provided with a motor 15 composed of an AC or DC servomotor and fixed thereon. The motor 15 has an output shaft 16 to which a gear 17 is fixed. On the other hand, two gears 18 are fixed, respectively, to front and rear ends of a rotary shaft of the lower knife cylinder 14. Further, two gears 19 are fixed, respectively, to front and rear ends of a rotary shaft of the upper knife cylinder 13. The gears 18 and the gears 19 are formed to have the same diameter, and corresponding ones of the gears 18, 19 are meshed with each other. The gear 17 is meshed with one of the gears 18 disposed rearwardly, to transmit rotation of the motor 15 to the lower knife cylinder 14.

Based on the mesh engagement between the gears 18 and the gears 19, the upper and lower knife cylinders 13, 14 are rotated in respective opposite directions at the same speed. A knife 20 and a knife 21 are attached, respectively, to the upper knife cylinder 13 and the lower knife cylinder 14, in such a manner as to protrude outwardly from respective outer peripheral surfaces thereof. Each of the knives 20, 21 is spirally arranged with respect to a rotational axis of a respective one of the upper and lower knife cylinders 13, 14.

In conjunction with the rotations of the upper and lower knife cylinders 13, 14, the knives 20, 21 cooperate with each other to cut the corrugated paperboard PB in a direction perpendicular to the conveyance direction FD. According to the spiral arrangement, the knives 20, 21 start cutting from one (rear side in FIG. 1) of width-directional opposite sides of the corrugated paperboard PB and complete the cutting at the other side (front side in FIG. 1). Corrugated paperboard sheets ST sequentially cut through the cutoff system are conveyed to and stacked by a stacker device of the corrugating machine.

<Various Detectors>

A pulse encoder PE1 is fixed to the output shaft 16 of the motor 15, and configured to generate pulses by a number corresponding to a rotation amount of the output shaft 16, i.e., a pulse signal having a frequency corresponding to a rotational speed of the output shaft 16 (motor speed). A measurement roll 22 is installed to a beam member disposed between the front and rear support frames 11, 12 at a position on an upstream side with respect to the installation position of the upper and lower knife cylinders 13, 14 in the conveyance direction FD. The measurement roll 22 is mounted to the beam member in such a manner as to be rotated while being kept in contact with a width-directional central region of an upper surface of the corrugated paperboard PB. A pulse encoder PE2 is fixed to a rotary shaft of the measurement roll 22, and configured to generate pulses by a number corresponding to a rotation amount of the rotary shaft, i.e., a pulse signal having a frequency corresponding to a rotational speed of the rotary shaft. That is, a pulse train generated from pulse encoder PE2 has a pulse number and a frequency corresponding to a conveyance amount or a conveyance speed of the corrugated paperboard PB.

A camera CA is fixed to an extension portion 12A of the rear support frame 12 extending leftwardly, at a position on a downstream side with respect to the installation position of the upper and lower knife cylinders 13, 14 in the conveyance direction FD. The camera CA is configured to image a region around a cut section LE of the corrugated paperboard PB cut by the cutoff system 1.

<<Electrical Configuration>>

Figure 2:
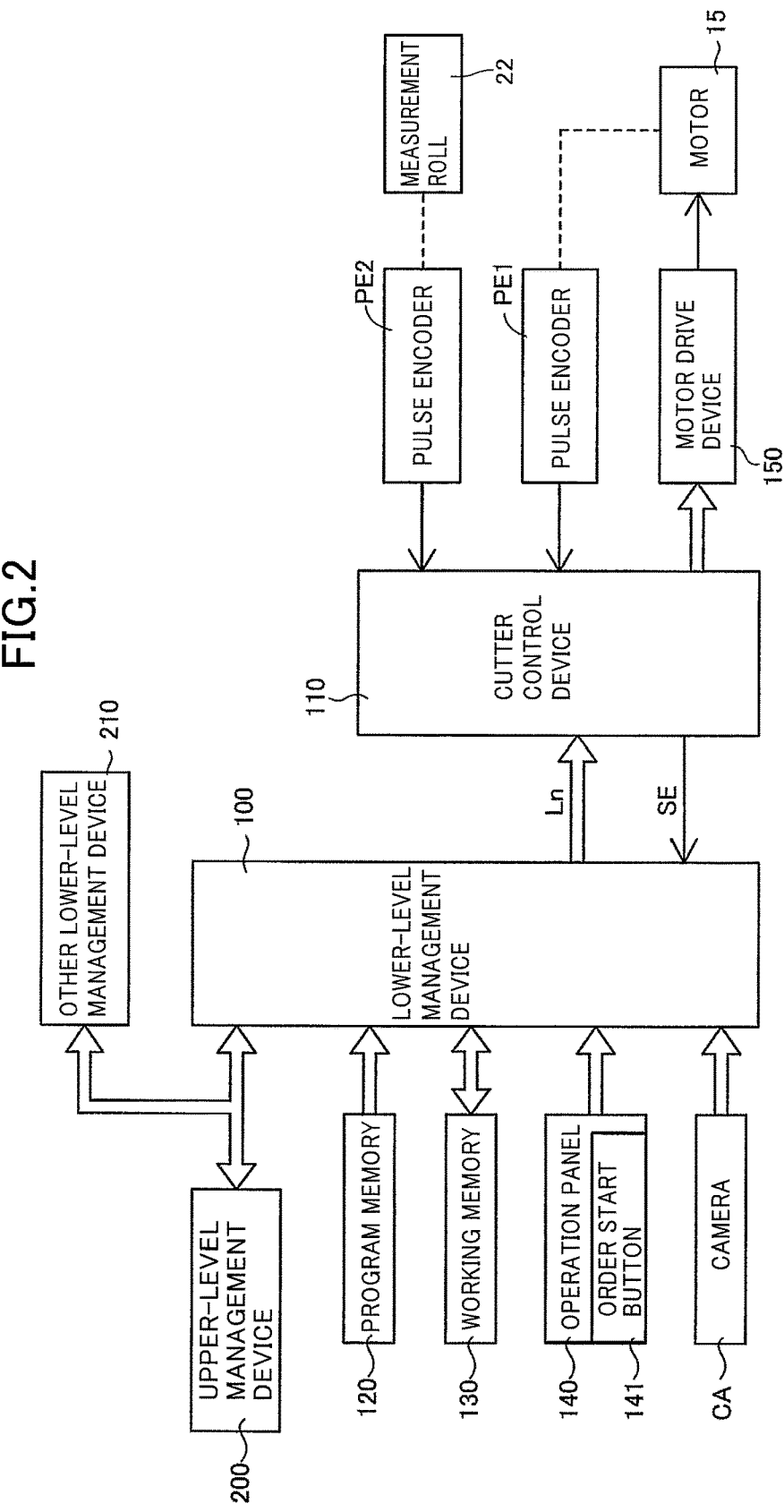
FIG. 2 is a block diagram illustrating an electrical configuration of the cutoff system.

With reference to FIG. 2, an electrical configuration of the cutoff system 1 according to the first embodiment will be described below. FIG. 2 is a block diagram primarily illustrating an electrical configuration of the cutoff system 1 according to this embodiment. A cutting operation of the cutoff system 1 is controlled by a lower-level management device 100 and a cutter control device 110. In FIG. 2, the lower-level management device 100 is connected to an upper-level management device 200 for generally managing processings of the corrugating machine. The upper-level management device 200 is configured to deliver control instruction information regarding a corrugated paperboard conveyance speed, a corrugated paperboard flute pitch, a corrugated paperboard size, a required sheet number and others, to the lower-level management device 100 and to other lower-level management device 210 for managing other processing apparatus such as a slitter-scorer, according to a predetermined processing management plan for a large number of orders.

Figure 3:
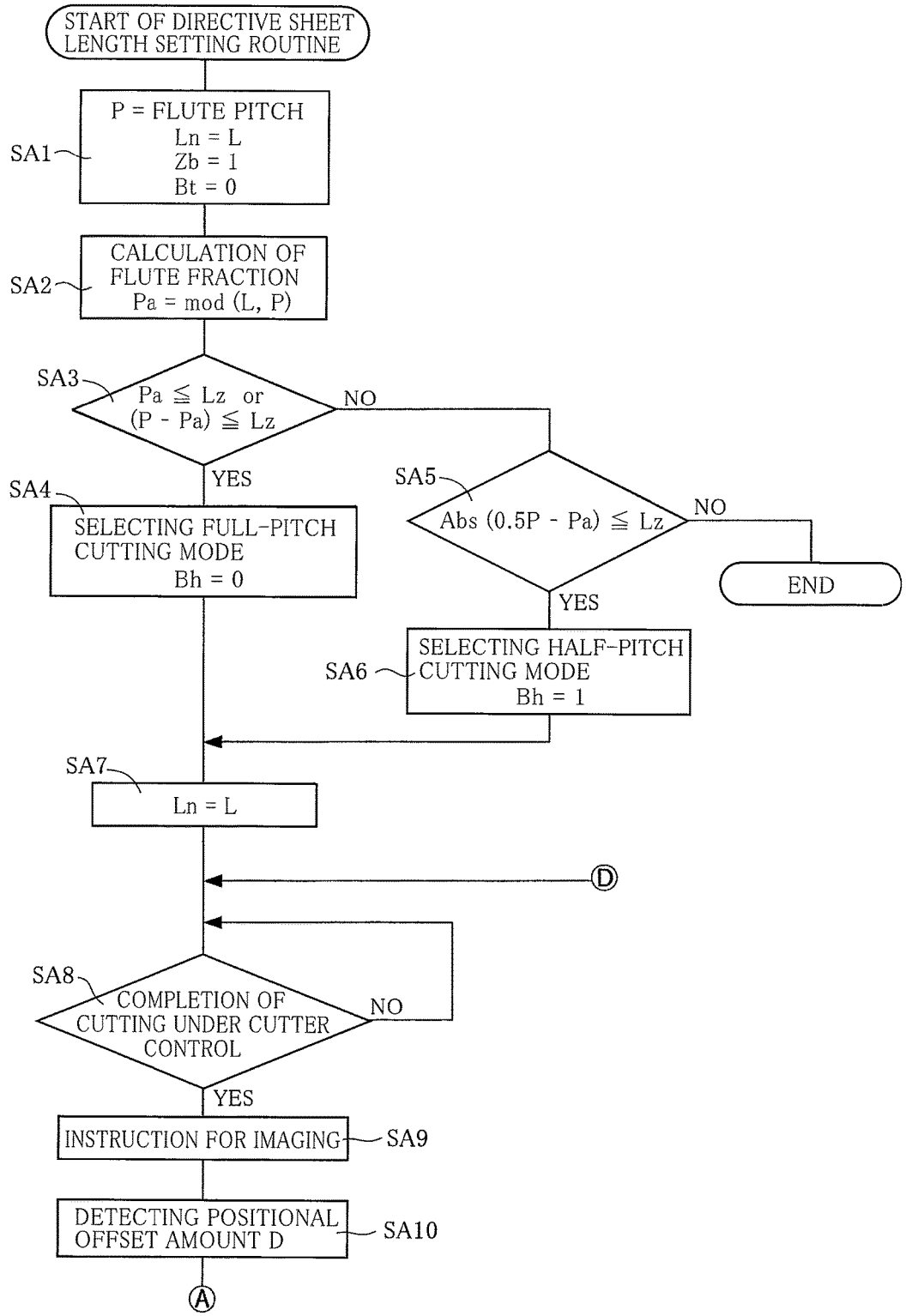
FIG. 3 is a flowchart illustrating a first processing region of a directive sheet length setting routine to be executed by a lower-level management device of the cutoff system.
Figure 4:
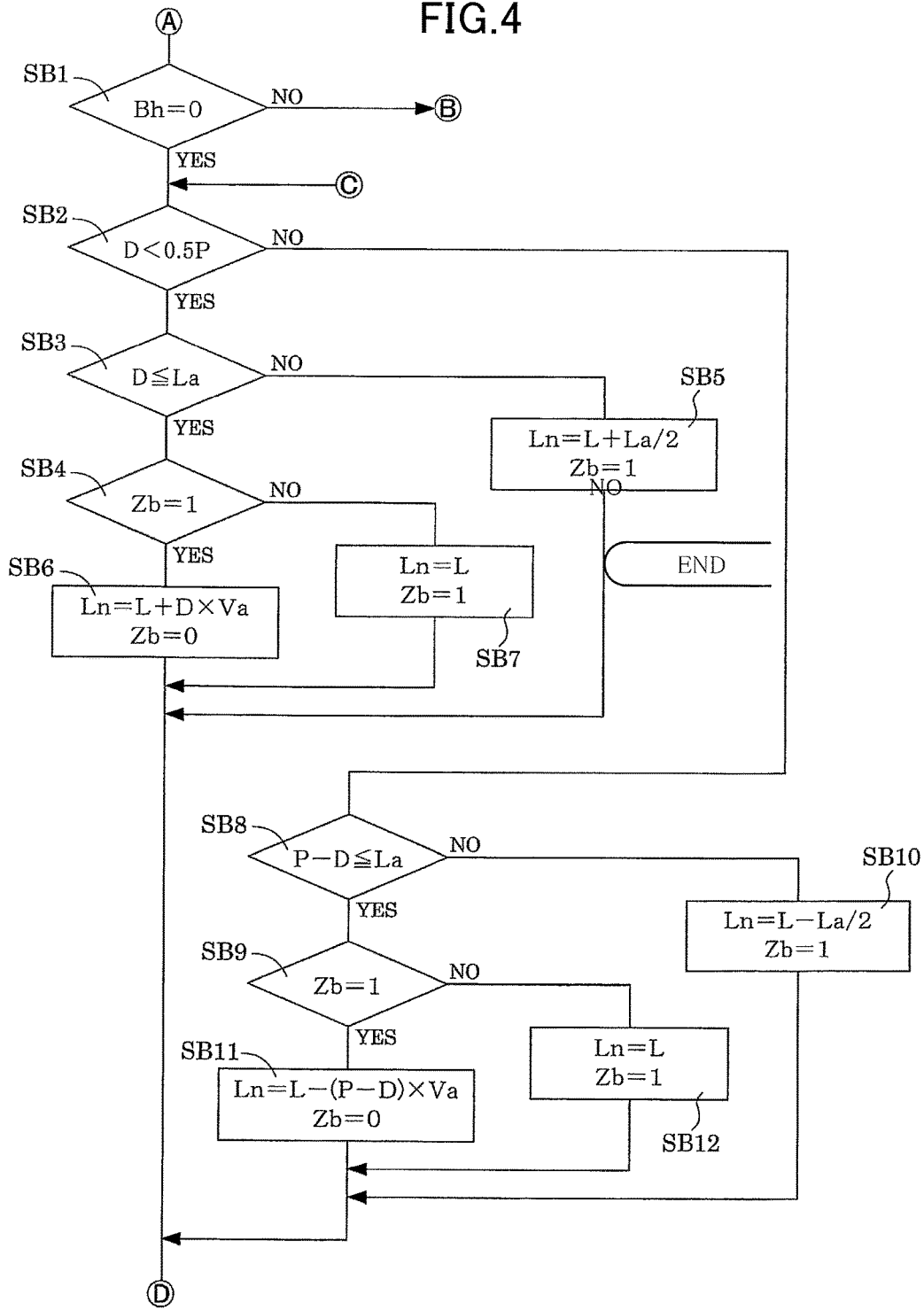
FIG. 4 is a flowchart illustrating a second processing region of the directive sheet length setting routine.
Figure 5:
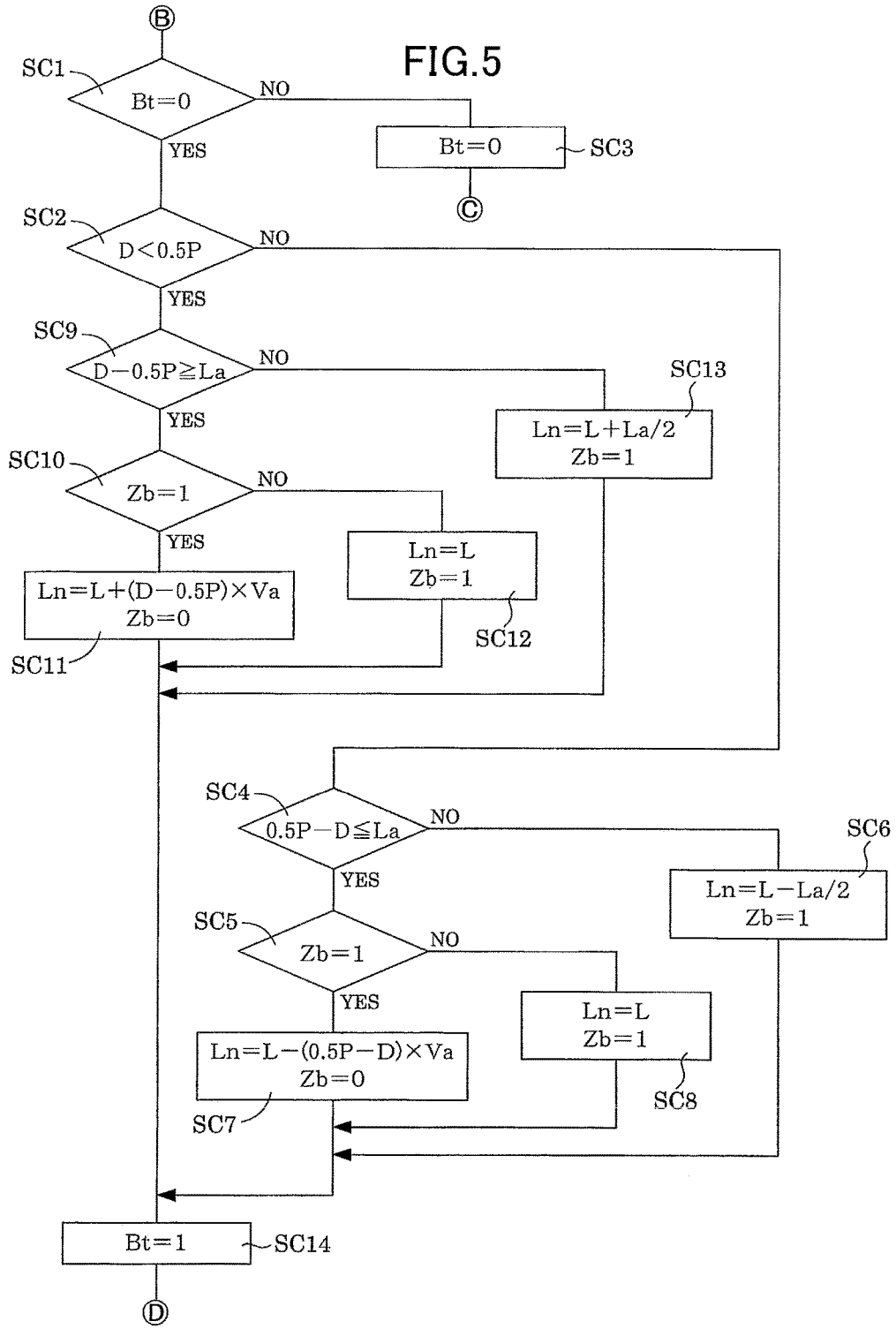
FIG. 5 is a flowchart illustrating a third processing region of the directive sheet length setting routine.

A program memory 120 fixedly stores therein programs such as a main control routine for the lower-level management device 100, a directive sheet length setting routine illustrated in FIGS. 3 to 5, and fixedly stores therein various preset values. A working memory 130 is configured to temporarily store therein a result of processing by the lower-level management device 100. An operation panel 140 is connected to the lower-level management device 100. The operation panel 140 has an order start button 141. The order start button 141 is a button to be manually operated by an operator in order to start to implement one order. The camera CA is connected to the lower-level management device 100 to supply an image indicative of the cut section LE of the corrugated paperboard PB, to the lower-level management device 100. The lower-level management device 100 constitutes a computer, together with the program memory 120 and the working memory 130.

The cutter control device 110 is configured to receive a directive sheet length Ln from the lower-level management device 100, and control the motor speed of the motor 15 according to the directive sheet length Ln. The cutter control device 110 is connected to each of the pulse encoder PE1 and the pulse encoder PE2, and configured to receive a pulse train corresponding a rotation amount or a rotational speed of the output shaft 16 of the motor 15, and a pulse train corresponding to a conveyance amount or a conveyance speed of the corrugated paperboard PB. The cutter control device 110 is configured to give an instruction to designate the motor speed of the motor 15 to a motor drive device 150. Specifically, the cutter control device 110 is configured to give an instruction to designate the motor speed of the motor 15 according to various variable speed patterns to be set based on the conveyance speed and the directive sheet length Ln. For example, during a time period where the knives 20, 21 are engaged with each other to cut the corrugated paperboard PB, the motor speed of the motor 15 is controlled to allow a rotational speed of the upper and lower knife cylinders 13, 14 to become equal to the conveyance speed. Further, during a time period after completion of a cutting operation for the corrugated paperboard PB through until a subsequent cutting operation for the corrugated paperboard PB is started, the motor speed of the motor 15 is controlled to allow the rotational speed of the upper and lower knife cylinders 13, 14 to be increased from the conveyance speed and then reduced to the conveyance speed, according to one variable speed pattern set based on a value of the directive sheet length Ln for the subsequent cutting. The cutter control device 110 is configured to, before completion of a current cutting operation for the corrugated paperboard PB, receive a value of the directive sheet length Ln for a subsequent cutting operation, from the lower-level management device 100. A configuration for controlling the motor speed of the motor 15 according to a variable speed pattern has heretofore been known, as disclosed, for example, in the Patent Document 1.

The cutter control device 110 is configured to recognize a time point when front regions of the knives 20, 21 are engaged with each other to complete a cutting operation, based on the pulse train from the pulse encoder PE1, and supply a cutting completion signal SE to the lower-level management device 100.

The program memory 120 fixedly stores therein various preset values for use in the directive sheet length setting routine. For example, as the preset values, the program memory 120 stores therein a dimensional error allowable value Lz, a cutting error allowable value La, a correction value Va, and others. Generally, a corrugated paperboard sheet has four flaps continuously connected in the conveyance direction FD, and a joint connected to one of the two flaps located at opposite edges of the corrugated paperboard sheet. In this case, the directive sheet length should be set such that, when the joint is bonded to the other flap to form a corrugated paperboard box, a gap between the two flaps bonded by the joint becomes a normal gap value. A size of the gap varies depending on the flute type, rigidity of a raw paperboard, and others. The dimensional error allowable value Lz is a value which is allowed as an error of the directive sheet length for setting the gap to the normal gap value, and is preliminarily set based on the flute type, a thickness of a raw paper board, the normal gap value, and others. In this embodiment, the dimensional error allowable value Lz is set to 1.5 mm for A-flute, and to 1.0 mm for B-flute. The dimensional error allowable value Lz is set to a larger value along with an increase in flute height and/or an increase in thickness of the raw paperboard. The cutting error allowable value La is a value unique to the cutoff system 1, and is a value which is allowed as a dimensional error, i.e., deviation of a length of a corrugated paperboard sheet ST actually cut by the cutoff system 1 in response to receiving an instruction to designate the directive sheet length Ln, with respect to a designated value of the directive sheet length Ln. Generally, the cutting error allowable value La is set to a value equal to or less than |1|. The correction value Va is a value which is preliminarily set based on an amount of deformation of an image obtained by the camera CA, an amount of misalignment of a cut line of the corrugated paperboard PB cut by the knives 20, 21, with respect to a direction perpendicular to the conveyance direction FD, and others. Generally, the correction value Va is set to a value satisfying the following relation: 0≤Va<1.

<<Operation and Functions of First Embodiment>>

An operation and functions of the cutoff system according to the first embodiment will be described below, with reference to the drawings. FIGS. 3 to 5 are flowcharts illustrating first to third processing regions of the directive sheet length setting routine. A processing in each step such as SA1 illustrated in FIGS. 3 to 5 is executed by the lower-level management device 100.

The directive sheet length setting routine in the first embodiment is executed to perform a processing of adjusting the directive sheet length Ln in such a manner as to allow a flute arrangement phase at a cut section LE of the corrugated paperboard PB to be cut by the knives 20, 21 to become coincident with a flute ridge or a flute trough. In this embodiment, the flute arrangement phase at the cut section LE is indicative of a distance from a given start position such as a flute trough to a cut position at which the cut section LE is located, in the conveyance direction, within one flute pitch of the corrugated paperboard PB. In the first embodiment, the directive sheet length Ln is adjustably set in such a manner as to allows the cut section LE to come closer to a nearest one of the flute troughs located upstream or downstream with respect to the cut section LE, or a nearest one of the flute ridges located upstream or downstream with respect the cut section LE. As regards a distance corresponding to a preset reference flute arrangement phase, when processings in SB2 to SB12 illustrated in FIG. 4 are performed, the nearest trough is used as an original (zero) point, so that a distance from the nearest trough is set to zero. On the other hand, when processings in SC1 to SC14 illustrated in FIG. 5 are performed, the nearest ridge is used as an original (zero) point, so that a distance from the nearest trough is set to one-half of one flute pitch P. The execution of the directive sheet length setting routine is started when an operator manually operates the order start button 141 of the operation panel 140.

<Cutting Operation for B-Flute Corrugated Paperboard PB>

First of all, the operation and functions of the cutoff system will be described on an assumption that an order for producing and cutting a B-flute corrugated paperboard PB is implemented. Generally, B-flute has a flute pitch of 6.0 mm.

The following description will be made on an assumption that a preset order-specified sheet length L designated by the upper-level management device 200 is different from a value of an integral multiple of the flute pitch P.

(Operation in Case where Preset Order-Specified Sheet Length L is 601 mm)

As regards an order, the following description will be made on an assumption that a preset order-specified sheet length L designated by the upper-level management device 200 is 601 mm which is a length different from a value of an integral multiple of the flute pitch P. Upon start of execution of the directive sheet length setting routine, in SA1, an initial setting is performed. Specifically, the flute pitch P is set to 6.0 mm which is a flute pitch of a B-flute corrugated paperboard PB to be cut according to a current order. A current preset order-specific directive sheet length L, i.e., 601 mm, is set as a directive sheet length Ln, and the lower-level management device 100 gives an instruction to designate this directive sheet length Ln as a directive sheet length Ln for a downstreammost sheet, to the cutter control device 110. A correction flag Zb stored in the working memory 130 is set to "1", and a cut phase flag Bt stored in the working memory 130 is set to "0". The cutter control device 110 starts to control the motor speed of the motor 15 according to the directive sheet length Ln (=L) for the downstreammost sheet.

In SA2, a flute fraction Pa is calculated. Specifically, the flute fraction Pa is a remainder as a result of dividing the directive sheet length L by the flute pitch P. In the SA2 illustrated in FIG. 3, a calculation processing for the flute fraction is denoted as follows: Pa=mod (L, P). In this embodiment, a remainder as a result of dividing 601 mm by 6.0 mm is 1 mm.

In SA3, it is determined whether or not the flute fraction Pa is equal to or less than the dimensional error allowable value Lz, or whether or not a value (P−Pa) obtained by subtracting the flute fraction Pa from the flute pitch P is equal to or less than the dimensional error allowable value Lz. When the flute fraction Pa or the subtracted value (P−Pa) is determined to be equal to or less than the dimensional error allowable value Lz (SA3: YES), the routine proceeds to SA4. On the other hand, when the flute fraction Pa or the subtracted value (P−Pa) is determined to be neither equal to nor less than the dimensional error allowable value Lz (SA3: NO), the routine proceeds to SA5. In this embodiment, a value of 1 mm for B-flute of the current order is read from the program memory 120 and set as the dimensional error allowable value Lz. At this moment, the flute fraction Pa (=1 mm) is equal to or less than the dimensional error allowable value Lz, so that the routine proceeds to the SA4.

In the SA4, a full-pitch cutting mode of cutting the corrugated paperboard PB according to a directive sheet length adjusted to have a value equal to an integral multiple of the flute pitch P is selected. Specifically, a cutting mode flag Bh stored in the working memory 130 is set to "0", so that a full-pitch cutting mode for the preset order-specified sheet length L: 601 mm, is selected.

In the SA5, it is determined whether or not an absolute value of a value obtained by subtracting the flute fraction Pa from one-half of the flute pitch P is equal to or less than the dimensional error allowable value Lz. When the absolute value is determined to be equal to or less than the dimensional error allowable value Lz (SA5: YES), the routine proceeds to SA6. On the other hand, When the absolute value is determined to be neither equal to nor less than the dimensional error allowable value Lz (SA5: NO), the routine is terminated. In the case where the absolute value is determined to be neither equal to nor less than the dimensional error allowable value Lz, and thereby the routine is terminated, the lower-level management device 100 successively gives instructions to designate the preset order-specified sheet length L to the cutter control device 110, because, in the SA1, the preset order-specified sheet length L: 601 mm, is set as a directive sheet length Ln.

In the SA6, a half-pitch cutting mode of cutting the corrugated paperboard PB according to a directive sheet length adjusted to have a value equal to an integral multiple of one-half of the flute pitch P is selected. Specifically, the cutting mode flag Bh stored in the working memory 130 is set to "1". As for the preset order-specified sheet length L: 601 mm, the half-pitch cutting mode is never selected.

After completion of the processing in the SA4 or SA6, SA7 is performed. In the SA7, the lower-level management device 100 gives an instruction to designate the preset current preset order-specified sheet length L: 601 mm, as a directive sheet length Ln for a second-downstreammost sheet ST2, to the cutter control device 110. The instruction to designate the directive sheet length Ln (=L) for the second-downstreammost sheet ST2 is given before completion of the cutting operation according to the directive sheet length for the downstreammost sheet. When the cutting operation according to the directive sheet length for the downstreammost sheet is completed, the cutter control device 110 starts to control the motor speed of the motor 15 according to the directive sheet length Ln for the second-downstreammost sheet.

In SA8, it is determined whether the cutting under cutter control is completed. Specifically, it is determined whether or not the lower-level management device 100 receives a cutting completion signal SE regarding the downstreammost sheet, from the cutter control device 110, during a time period where the lower-level management device 100 controls the cutting operation for the corrugated paperboard PB, according to the directive sheet length Ln for the downstreammost sheet designated in the SA1. When it is determined that the cutting completion signal SE is received (SA8: YES), the routine proceeds to SA9. On the other hand, when it is determined that the cutting completion signal SE is not received (SA8: NO), the determination in the SA8 is repeatedly performed. At a time point when the cutting completion signal SE is received, the downstreammost sheet is separated from the corrugated paperboard PB.

In the SA9, the camera CA is instructed to image a region around the cut section LE of the corrugated paperboard PB. In this embodiment, the cut section LE corresponds to a leading edge of the corrugated paperboard PB after the downstreammost sheet is separated therefrom, i.e., a leading edge of the second-downstreammost sheet. Thus, a region around this leading edge within a range corresponding to at least one flute pitch is imaged.

In SA10, image data obtained by the camera CA is supplied from the camera CA to the lower-level management device 100, wherein the image data is subjected to image processing for detecting the positional offset amount D. The positional offset amount D means a distance from a nearest one of the flute troughs located upstream with respect to the cut section LE in the conveyance direction FD, to the cut section LE. In the SA10, as the image processing for detecting the positional offset amount D, a pattern matching processing is performed to detect a nearest one of the flute troughs located upstream with respect to the cut section LE.

In SB1 illustrated in FIG. 4, it is determined whether or not the cutting mode flag Bh is "0". When the cutting mode flag Bh is determined to be "0" (SB1: YES), the routine proceeds to SB2. On the other hand, the cutting mode flag Bh is determined to be not "0" (SB1: NO), the routine proceeds to SC1 illustrated in FIG. 5. At this moment, the cutting mode flag Bh is set to "0" in the SA4. Thus, the routine proceeds to the SB2.

In the SB2, it is determined whether or not the positional offset amount D is less than one-half of the flute pitch P. When the positional offset amount D is determined to be less than one-half of the flute pitch P (SB2: YES), the routine proceeds to SB3. On the other hand, when the positional offset amount D is determined to be not less than one-half of the flute pitch P (SB2: NO), the routine proceeds to SB8.

Figure 6:
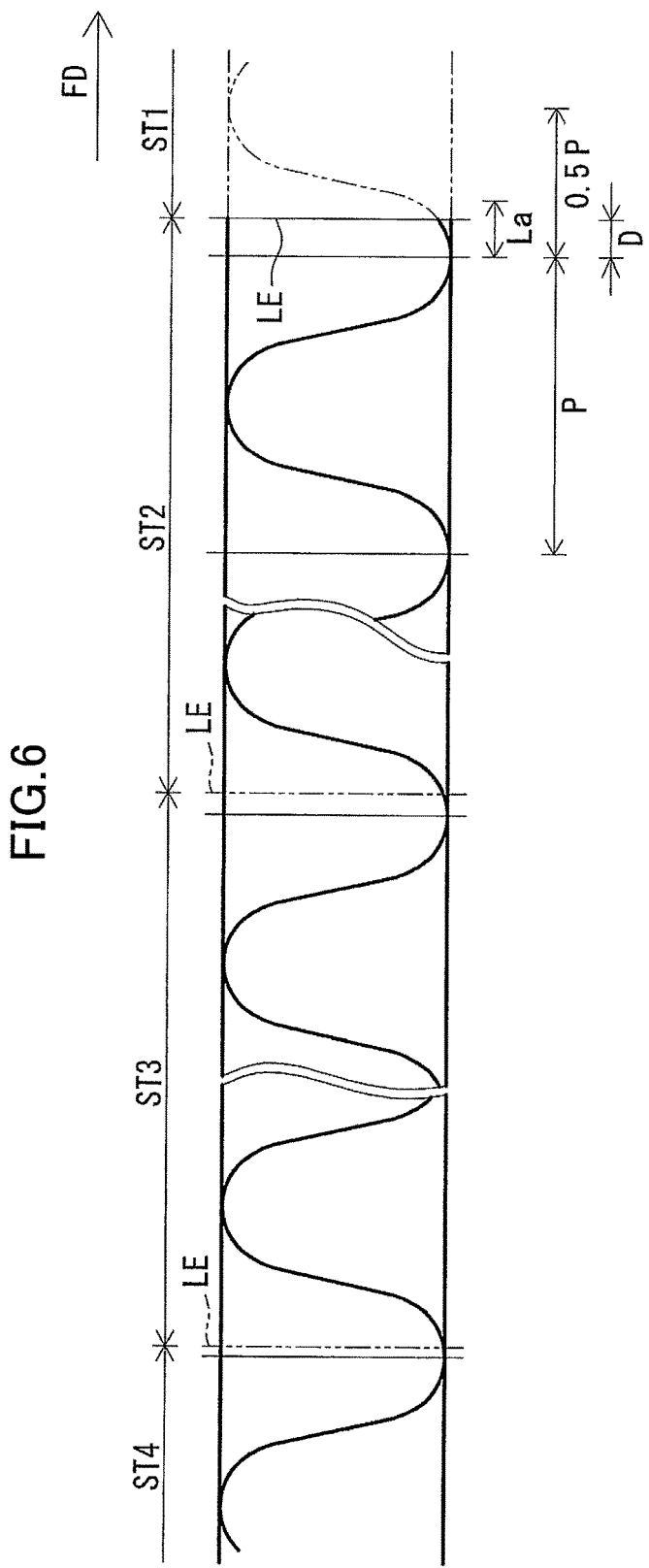
FIG. 6 is an explanatory diagram illustrating a cut section LE obtained under selection of a full-pitch cutting mode, wherein a positional offset amount D is less than one-half of a flute pitch P, and is equal to or less than a dimensional error allowable value La.
Figure 7:
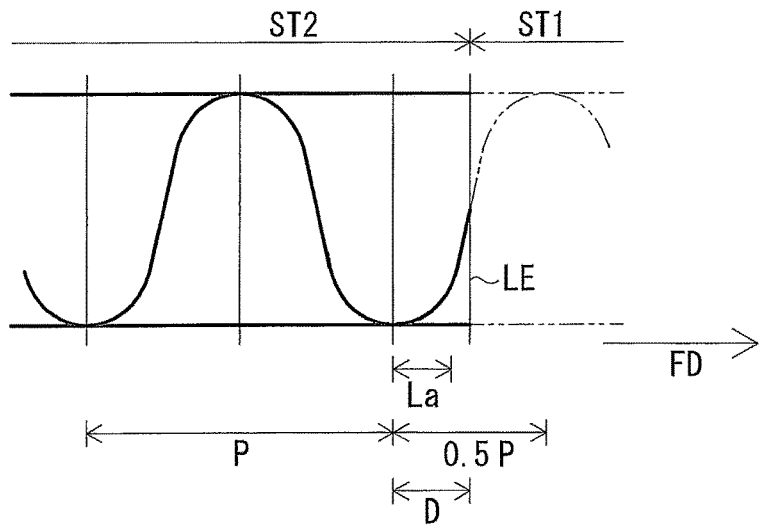
FIG. 7 is an explanatory diagram illustrating a cut section LE obtained under selection of the full-pitch cutting mode, wherein the positional offset amount D is less than one-half of the flute pitch P, and is greater than the dimensional error allowable value La.
Figure 8:
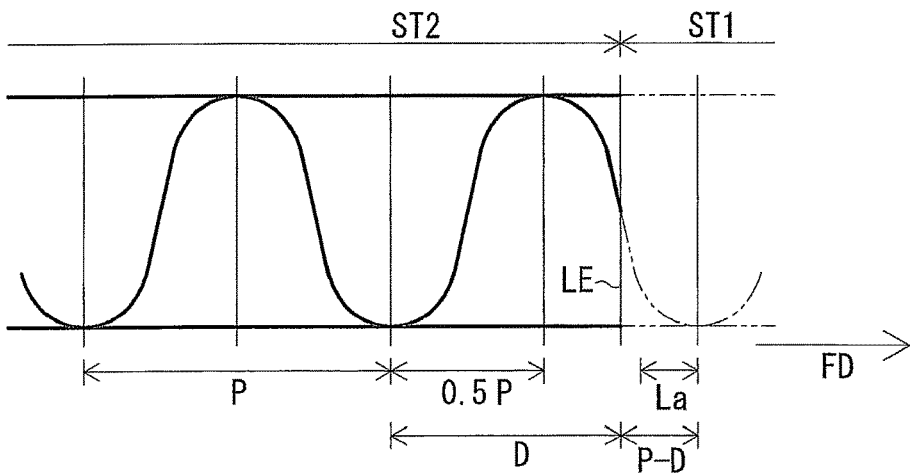
FIG. 8 is an explanatory diagram illustrating a cut section LE obtained under selection of the full-pitch cutting mode, wherein the positional offset amount D is equal to or greater than one-half of the flute pitch P, and a subtracted value (P−D) is equal to or less than the dimensional error allowable value La.
Figure 9:
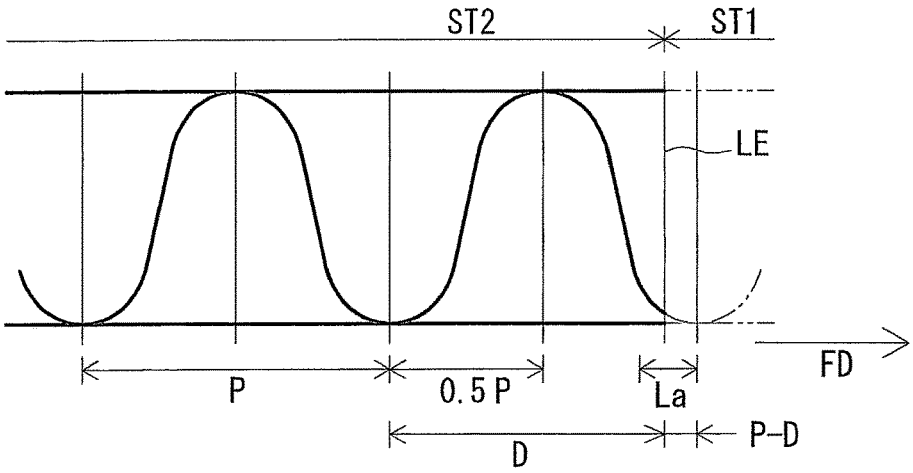
FIG. 9 is an explanatory diagram illustrating a cut section LE obtained under selection of the full-pitch cutting mode, wherein the positional offset amount D is equal to or greater than one-half of the flute pitch P, and the subtracted value (P−D) is greater than the dimensional error allowable value La.

With reference to FIGS. 6 to 9, an operation of switching between contents of processing, according to a flute arrangement state of the corrugated paperboard PB will be described. FIGS. 6 to 9 enlargedly illustrate the flute arrangement state of the corrugated paperboard PB. Each of the flute ridges and troughs of the corrugated paperboard PB extends in a direction crossing the conveyance direction FD. Generally, each of the flute ridges and troughs extends in a direction approximately perpendicular to the conveyance direction FD. For example, in FIGS. 6 and 7, a position of the cut section LE, i.e., a cut position, is away, by the positional offset amount D, from a nearest one of the flute troughs located upstream with respect to the cut section LE (rightward with respect to the cut section LE). In FIGS. 8 and 9, the position of the cut section LE is away, by the positional offset amount D, from a nearest one of the flute troughs located upstream with respect to the cut section LE across one flute ridge. As illustrated in FIG. 6 or 7, when the positional offset amount D is less than one-half (0.5 P) of the flute pitch P, the routine proceeds to the SB3. On the other hand, as illustrated in FIG. 8 or 9, when the positional offset amount D is equal to or greater than one-half (0.5 P) of the flute pitch P, the routine proceeds to the SB8. In FIGS. 6 to 9, ST1 indicates a downstreammost sheet, and ST2, ST3 and ST4 indicate portions of the corrugated paperboard PB to be formed, respectively, as a second-downstreammost sheet, a third-downstreammost sheet and a fourth-downstreammost sheet. Further, a presumptive leading edge to be formed as a cut section LE of the third-downstreammost sheet ST3, and a presumptive leading edge to be formed as a cut section LE of the fourth-downstreammost sheet ST4 are indicated by the two-dot chain lines. In FIGS. 6 to 9, the downstreammost sheet ST1 is separated from the second-downstreammost sheet ST2, the cut section LE indicated by the solid line represents a leading edge of the second-downstreammost sheet ST2.

In the SB3, it is determined whether or not the positional offset amount D is equal to or less than the cutting error allowable value La. When the positional offset amount D is determined to be equal to or less than the cutting error allowable value La (SB3: YES), the routine proceeds to SB4. On the other hand, when the positional offset amount D is determined to be neither equal to nor less than the cutting error allowable value La (SB3: NO), the routine proceeds to SB5. For example, as illustrated in FIG. 6, when the positional offset amount D is equal to or less than the cutting error allowable value La, the routine proceeds to SB4. On the other hand, as illustrated in FIG. 7, when the positional offset amount D is greater than the cutting error allowable value La, the routine proceeds to SB5.

In the SB4, it is determined whether or not the correction flag Zb is "1". When the correction flag Zb is determined to be "1" (SB4: YES), the routine proceeds to SB6. On the other hand, when the correction flag Zb is determined to be not "1" (SB4: NO), the routine proceeds to SB7. At this moment, the correction flag Zb is set to "1" in the SA1. Thus, the routine proceeds to SB6.

In the SB6, a value obtained by adding the preset order-specified sheet length L to a value (D×Va) obtained by multiplying the positional offset amount D by the correction value Va is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "0". A reason why the correction flag Zb is set to "0" is to avoid a situation where the SB6 is successively performed for two successive sheets. The directive sheet length Ln for the third-downstreammost sheet is adjustably set in such a manner as to allow a cut section LE located at the presumptive leading edge of the fourth-downstreammost sheet to come closer to a nearest one of the flute troughs located upstream with respect to the cut section LE, as illustrated in FIG. 6.

When the correction flag Zb is not set to "1", a processing in the SB7 is performed. In the SB7, the preset order-specified sheet length L is set as a directive sheet length Ln. The lower-level management device 100 gives an instruction to designate this directive sheet length Ln L) as a directive sheet length Ln for the third-downstreammost sheet ST3 to the cutter control device 110. Further, the correction flag Zb is set to "1".

When the positional offset amount D is determined to be neither equal to nor less than the cutting error allowable value La, a processing in the SB5 is performed. In the SB5, a value obtained by adding the preset order-specified sheet length L to one-half of the cutting error allowable value La is set as a directive sheet length Ln. The lower-level management device 100 gives an instruction to designate the adjusted directive sheet length Ln as a directive sheet length Ln for the third-downstreammost sheet ST3, to the cutter control device 110. Further, the correction flag Zb is set to "1". In this case, the directive sheet length Ln for the third-downstreammost sheet is also adjusted in such a manner as to allow a cut section LE located at the presumptive leading edge of the fourth-downstreammost sheet to come closer to a nearest one of the flute troughs located upstream with respect to the cut section, as with the state illustrated in FIG. 6.

In the SB2, when the positional offset amount D is determined to be not less than one-half of the flute pitch P (SB2: NO), a processing in the SB8 is performed. In the SB8, it is determined whether or not a value (P−D) obtained by subtracting the positional offset amount D from the flute pitch P is equal to or less than the cutting error allowable value La. When the subtracted value (P−D) is determined to be equal to or less than the cutting error allowable value La (SA8: YES), the routine proceeds to SB9. On the other hand, when the subtracted value (P−D) is determined to be neither equal to nor less than the cutting error allowable value La (SA8: NO), the routine proceeds to SB10. For example, as illustrated in FIG. 9, when the subtracted value (P−D) is equal to or less than the dimensional error allowable value La, the routine proceeds to SB9. On the other hand, as illustrated in FIG. 8, when the subtracted value (P−D) is greater than the dimensional error allowable value La, the routine proceeds to SB10.

In the SB9, it is determined whether or not the correction flag Zb is "1". When the correction flag Zb is determined to be "1" (SB9: YES), the routine proceeds to SB11. On the other hand, when the correction flag Zb is determined to be not "1" (SB9: NO), the routine proceeds to SB12. At this moment, the correction flag Zb is set to "1" in the SA1. Thus, the routine proceeds to the SB11.

In the SB11, a value [(P−D)×Va] obtained by multiplying the subtracted value (P−D) by the correction value Va is derived, and a value obtained by subtracting the derived value [(P−D)×Va] from the preset order-specified sheet length L is set as a directive sheet length Ln. The lower-level management device 100 gives an instruction to designate this directive sheet length Ln, as a directive sheet length Ln for the third-downstreammost sheet ST3, to the cutter control device 110. Further, the correction flag Zb is set to "0". In this case, the directive sheet length Ln for the third-downstreammost sheet is also adjusted in such a manner as to allow a cut section LE located at the presumptive leading edge of the fourth-downstreammost sheet to come closer to a nearest one of the flute troughs located upstream with respect to the cut section LE.

When the correction flag Zb is not set to "1", a processing in the SB12 is performed. In the SB12, the preset order-specified sheet length L is set as a directive sheet length Ln. The lower-level management device 100 gives an instruction to designate this directive sheet length Ln (=L) as a directive sheet length Ln for the third-downstreammost sheet ST3, to the cutter control device 110. Further, the correction flag Zb is set to "1".

In the SB8, when the subtracted value (P−D) is determined to be neither equal to nor less than the cutting error allowable value La (SA8: NO), a processing in the SB10 is performed. In the SB10, a value obtained by subtracting one-half of the cutting error allowable value La from the preset order-specified sheet length L is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "1". In this case, the directive sheet length Ln for the third-downstreammost sheet is also adjusted in such a manner as to allow a cut section LE located at the presumptive leading edge of the fourth-downstreammost sheet to come closer to a nearest one of the flute troughs located upstream with respect to the cut section.

When any of the SB5 to SB7 or any of SB10 to SB12 is performed, the routine returns to SA8 illustrated in FIG. 3. In the SA8, it is determined whether the cutting under cutter control is completed. Specifically, it is determined whether or not the lower-level management device 100 receives a cutting completion signal SE regarding the second-downstreammost sheet, from the cutter control device 110, during a time period where the lower-level management device 100 controls the cutting operation for the corrugated paperboard PB, according to the directive sheet length Ln for the second-downstreammost sheet designated in the SA7. When it is determined that the cutting completion signal SE is received (SA8: YES), the routine proceeds to SA9. At a time point when the cutting completion signal SE is received, the second-downstreammost sheet ST2 is separated from the corrugated paperboard PB.

In the SA9, the camera CA is instructed to image a region around the cut section LE of the corrugated paperboard PB. In this embodiment, the cut section LE corresponds to a leading edge of the corrugated paperboard PB after the second-downstreammost sheet ST2 is separated therefrom, i.e., a leading end portion of the third-downstreammost sheet ST3. Thus, a region around the leading edge corresponding to a plurality of flute pitches is imaged. In the SA10, image data obtained by the camera CA is supplied from the camera CA to the lower-level management device 100, wherein the image data is subjected to image processing for detecting the positional offset amount D. Subsequently, the processings in the SB1 to SB12 are performed in the same manner, and the processings in the SA8 to SA10 and the processings in the SB1 to SB12 are repeatedly performed. Therefore, as for the third-downstreammost sheet and subsequent sheets, a directive sheet length Ln is set according to the full-pitch cutting mode. That is, a directive sheet length Ln is set on a per-sheet basis in such a manner as to allow the cut section LE to come closer to a nearest one of the flute troughs located upstream or downstream with respect to the cut section LE.

(Operation in Case where Preset Order-Specified Sheet Length L is 605 mm)

As regards an order, the following description will be made on an assumption that a preset order-specified sheet length L designated by the upper-level management device 200 is 605 mm which is a length different from a value of an integral multiple of the flute pitch P. The operation to be performed by setting the preset order-specified sheet length L to 605 mm is partially the same as the operation to be performed by setting the preset order-specified sheet length L to 601 mm, and therefore only differences therebetween will be described.

In the SA2, the flute fraction Pa is calculated as 5 mm which a remainder as a result of dividing 605 mm by 6.0 mm.

In the SA3, it is determined whether or not a value (1 mm) obtained by subtracting the flute fraction Pa (=5 mm) from the flute pitch P (=6.0 mm) is equal to or less than the dimensional error allowable value Lz (=1 mm). The subtracted value is equal to or less than the dimensional error allowable value Lz, and thus the routine proceeds to the SA4.

In the SA4, the cutting mode flag Bh stored in the working memory 130 is set to "0", so that a full-pitch cutting mode for the preset order-specified sheet length L: 605 mm, is selected. The operation to be performed by setting the preset order-specified sheet length L to 605 mm after the selection of the full-pitch cutting mode is the same as the operation to be performed by setting the preset order-specified sheet length L to 601 mm.

As regards orders for producing and cutting a B-flute corrugated paperboard PB, assume that one of 600 mm, 601 mm, 605 mm and 606 mm falling within the range of 600 mm to 606 mm is designated as the preset order-specified sheet length L. In this case, in the SA4, the full-pitch cutting mode is selected, and a directive sheet length Ln is set on a per-sheet basis in such a manner as to allow the cut section LE to come closer to a nearest one of the flute troughs located upstream or downstream with respect to the cut section LE.

(Operation in Case where Preset Order-Specified Sheet Length L is 602 mm)

As regards an order, the following description will be made on an assumption that a preset order-specified sheet length L designated by the upper-level management device 200 is 602 mm which is a length different from a value of an integral multiple of the flute pitch P. The operation to be performed by setting the preset order-specified sheet length L to 602 mm is partially the same as the operation to be performed by setting the preset order-specified sheet length L to 601 mm, and therefore only differences therebetween will be described.

Upon start of execution of the directive sheet length setting routine, in the SA1, an initial setting including setting of various flags is performed. Specifically, the flute pitch P is set to 6.0 mm which is a flute pitch of a B-flute corrugated paperboard PB to be cut according to a current order. A current order-specific preset order-specified sheet length L, i.e., 602 mm, is set as a directive sheet length Ln, and the lower-level management device 100 gives an instruction to designate this directive sheet length Ln as a directive sheet length Ln for a downstreammost sheet, to the cutter control device 110. Subsequently, in the SA2, the flute fraction Pa is calculated as 2 mm which a remainder as a result of dividing 602 mm by 6.0 mm.

In the SA3, it is determined whether or not the flute fraction Pa (=2 mm), or a value (4 mm) obtained by subtracting the flute fraction Pa (=2 mm) from the flute pitch P (=6.0 mm) is equal to or less than the dimensional error allowable value Lz (=1 mm). Each of the flute fraction Pa and the subtracted value is greater than the dimensional error allowable value Lz, and thus the routine proceeds to the SA5.

In the SA5, it is determined whether or not an absolute value (=1 mm) of a value (0.5P–Pa) obtained by subtracting the flute fraction Pa (=2 mm) from one-half (=3.0 mm) of the flute pitch P is equal to or less than the dimensional error allowable value Lz (=1 mm). The absolute value of the subtracted value is equal to or less than the dimensional error allowable value Lz, and thus the routine proceeds to the SA6.

In the SA6, the cutting mode flag Bh stored in the working memory 130 is set to "1", i.e., a half-pitch cutting mode for the preset order-specified sheet length L: 602 mm, is selected.

In the SA7, the lower-level management device 100 gives an instruction to designate the current order-specific preset order-specified sheet length L: 602 mm, as a directive sheet length Ln for a second-downstreammost sheet ST2, to the cutter control device 110. In the SA8, it is determined whether or not the lower-level management device 100 receives a cutting completion signal SE regarding the downstreammost sheet, from the cutter control device 110, during a time period where the lower-level management device 100 controls the cutting operation for the corrugated paperboard PB, according to the directive sheet length Ln for the downstreammost sheet. The cut section LE corresponds to a leading edge of the corrugated paperboard PB after the downstreammost sheet is separated therefrom, i.e., a leading edge of the second-downstreammost sheet. Thus, in the SA9, a region around this leading edge within a range corresponding to at least one flute pitch is imaged.

After performing the processings in the SA9 and SA10, the processing in the SB 1 illustrated in FIG. 4 is performed. In the SB1, it is determined whether or not the cutting mode flag Bh is "0". The cutting mode flag Bh is set to "1" in the SA6. Thus, the cutting mode flag Bh is determined to be not "0" (SB1: NO), and the routine proceeds to the SC1 illustrated in FIG. 5.

In the SC1, it is determined whether or not the cut phase flag Bt stored in the working memory 130 is "0". When the cut phase flag Bt is determined to be "0" (SC1: YES), the routine proceeds to SC2. On the other hand, when the cut phase flag Bt is determined to be not "0" (SC1: NO), the routine proceeds to SC3.

In the SC2, it is determined whether or not the positional offset amount D is less than one-half of the flute pitch P. When the positional offset amount D is determined to be less than one-half of the flute pitch P (SC2: YES), the routine proceeds to SC4. On the other hand, when the positional offset amount D is determined to be not less than one-half of the flute pitch P (SC2: NO), the routine proceeds to SC9.

In the SC1, when the cut phase flag Bt is determined to be not "0" (SC1: NO), a processing in the SC3 is performed. In the SC3, the cut phase flag Bt is set to "0", and the routine proceeds to the SB2 illustrated in FIG. 4.

Figure 10:
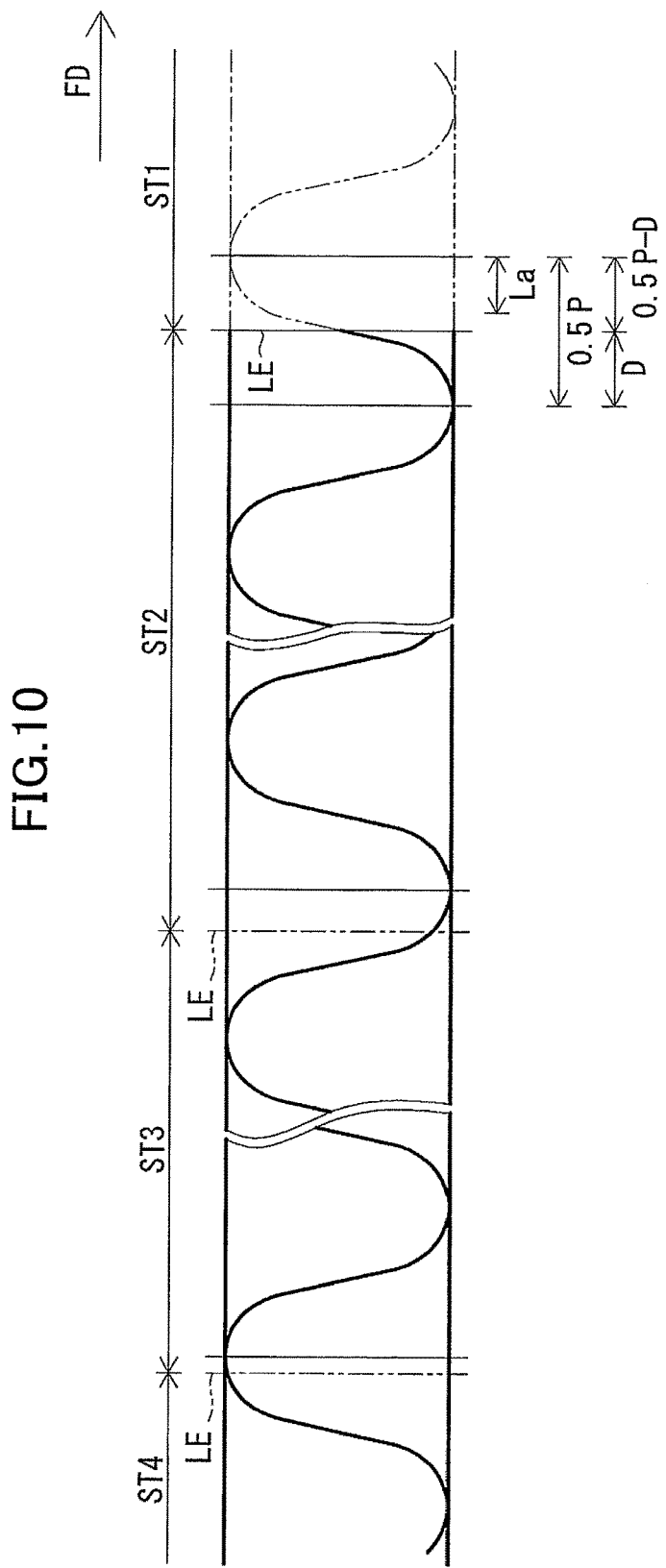
FIG. 10 is an explanatory diagram illustrating a cut section LE obtained under selection of a half-pitch cutting mode, wherein the positional offset amount D is equal to or less than one-half of the flute pitch P, and a subtracted value (0.5P−D) is equal to or greater than the dimensional error allowable value La.
Figure 11:
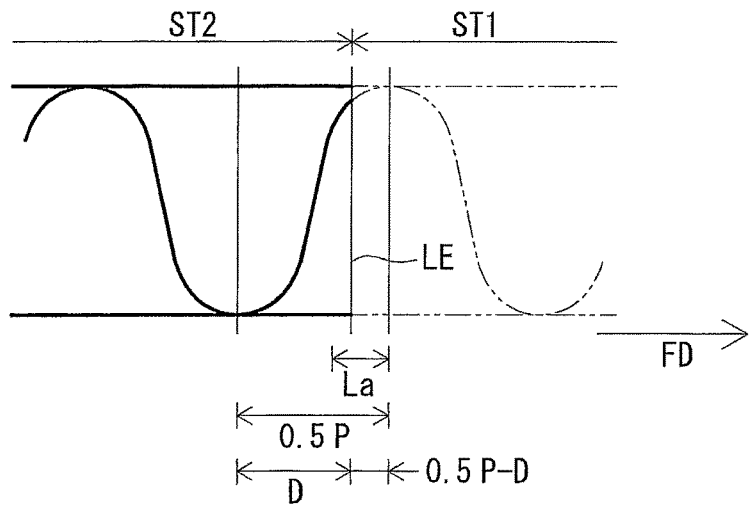
FIG. 11 is an explanatory diagram illustrating a cut section LE obtained under selection of the half-pitch cutting mode, wherein the positional offset amount D is equal to or less than one-half of the flute pitch P, and the subtracted value (0.5P−D) is less than the dimensional error allowable value La.

In the SC2, when the positional offset amount D is determined to be less than one-half of the flute pitch P (SC2: YES), a processing in the SC4 is performed. In the SC4, it is determined whether or not a value (0.5P−D) obtained by subtracting the positional offset amount D from one-half of the flute pitch P is equal to or less than the cutting error allowable value La. When the subtracted value (0.5P−D) is determined to be equal to or less than the cutting error allowable value La (SC4: YES), the routine proceeds to SC5. On the other hand, when the subtracted value (0.5P−D) is determined to be neither equal to nor less than the cutting error allowable value La (SC4: NO), the routine proceeds to SC6. For example, as illustrated in FIG. 10, the subtracted value (0.5P−D) is greater than the cutting error allowable value La, the routine proceeds to SC6. On the other hand, as illustrated in FIG. 11, the subtracted value (0.5P−D) is equal to or less than the cutting error allowable value La, the routine proceeds to SC5.

In the SC4, when the subtracted value (0.5P−D) is determined to be neither equal to nor less than the cutting error allowable value La (SC4: NO), a processing in the SC6 is performed. In the SC6, a value obtained by subtracting one-half of the cutting error allowable value La from the preset order-specified sheet length L is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "1". The directive sheet length Ln for the third-downstreammost sheet is adjustably set in such a manner as to allow a cut section LE located at the presumptive leading edge of the fourth-downstreammost sheet to come closer to a nearest one of the flute ridges located downstream with respect to the cut section LE, as illustrated in FIG. 10.

In the SC5, it is determined whether or not the correction flag Zb is "1". When the correction flag Zb is determined to be "1" (SC5: YES), the routine proceeds to SC7. On the other hand, when the correction flag Zb is determined to be not "1" (SC5: NO), the routine proceeds to SC8. At this moment, the correction flag Zb is set to "1" in the SA1. Thus, the routine proceeds to the SC7.

In the SC7, a value [(0.5P−D)×Va] obtained by multiplying the subtracted value (0.5P−D) by the correction value Va is derived, and a value obtained by subtracting the derived value [(0.5P−D)×Va] from the preset order-specified sheet length L is set as a directive sheet length Ln. The lower-level management device 100 gives an instruction to designate this directive sheet length Ln, as a directive sheet length Ln for the third-downstreammost sheet ST3, to the cutter control device 110. Further, the correction flag Zb is set to "0". In this case, the directive sheet length Ln for the third-downstreammost sheet is also adjusted in such a manner as to allow a cut section LE located at the presumptive leading edge of the fourth-downstreammost sheet to come closer to a nearest one of the flute ridges located downstream with respect to the cut section LE, as with the state illustrated in FIG. 10.

When the correction flag Zb is not set to "1", a processing in the SC8 is performed. In the SC8, the preset order-specified sheet length L is set as a directive sheet length Ln. The lower-level management device 100 gives an instruction to designate this directive sheet length Ln (=L) as a directive sheet length Ln for the third-downstreammost sheet ST3, to the cutter control device 110. Further, the correction flag Zb is set to "1".

Figure 12:
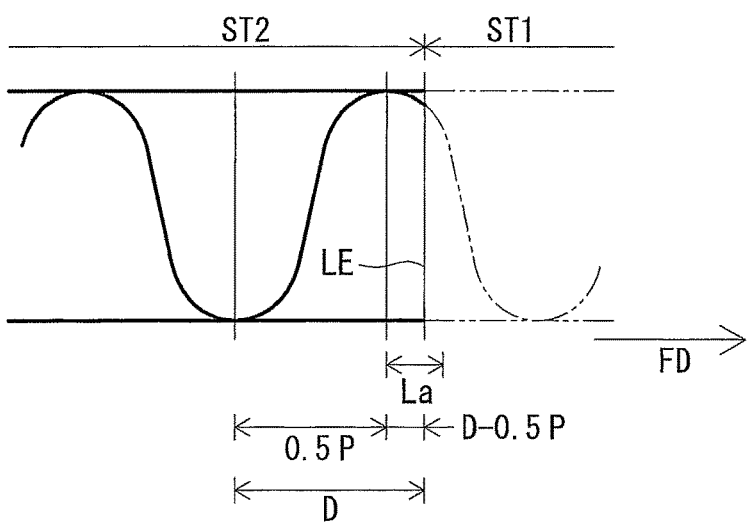
FIG. 12 is an explanatory diagram illustrating a cut section LE obtained under selection of the half-pitch cutting mode, wherein the positional offset amount D is greater than one-half of the flute pitch P, and the subtracted value (D−0.5P) is equal to or less than the dimensional error allowable value La.
Figure 13:
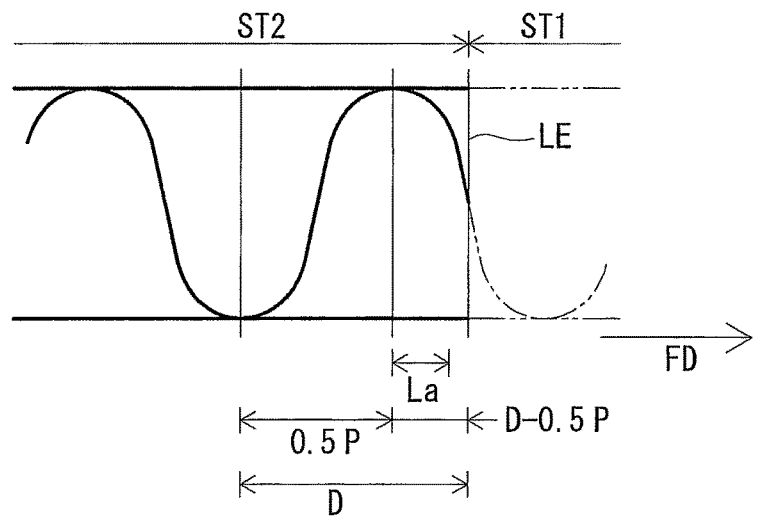
FIG. 13 is an explanatory diagram illustrating a cut section LE obtained under selection of the half-pitch cutting mode, wherein the positional offset amount D is greater than one-half of the flute pitch P, and the subtracted value (D−0.5P) is greater than the dimensional error allowable value La.

In the SC2, when the positional offset amount D is determined to be not less than one-half of the flute pitch P (SC2: NO), a processing in the SC9 is performed. In the SC9, a value (D−0.5P) obtained by subtracting one-half of the flute pitch P from the positional offset amount D is derived, and it is determined whether or not the subtracted value is equal to or greater than the cutting error allowable value La. When the subtracted value (D−0.5P) is determined to be equal to or greater than the cutting error allowable value La (SC9: YES), the routine proceeds to SC13. On the other hand, when the subtracted value (D−0.5P) is determined to be neither equal to nor greater than the cutting error allowable value La (SC9: NO), the routine proceeds to SC10. For example, as illustrated in FIG. 12, the subtracted value (D−0.5P) is less than the cutting error allowable value La, the routine proceeds to SC10. On the other hand, as illustrated in FIG. 13, the subtracted value (D−0.5P) is equal to or greater than the cutting error allowable value La, the routine proceeds to SC13.

In the SC10, it is determined whether or not the correction flag Zb is "1". When the correction flag Zb is determined to be "1" (SC10: YES), the routine proceeds to SC11. On the other hand, when the correction flag Zb is determined to be not "1" (SC10: NO), the routine proceeds to SC12. At this moment, the correction flag Zb is set to "1" in the SA1. Thus, the routine proceeds to the SC11.

In the SC11, a value [(D−0.5P)×Va] obtained by multiplying the subtracted value (D−0.5P) by the correction value Va is derived, and a value obtained by adding the derived value [(D−0.5P)×Va] to the preset order-specified sheet length L is set as a directive sheet length Ln. The lower-level management device 100 gives an instruction to designate this directive sheet length Ln, as a directive sheet length Ln for the third-downstreammost sheet ST3, to the cutter control device 110. Further, the correction flag Zb is set to "0". A reason why the correction flag Zb is set to "0" is to avoid a situation where the SC11 is successively performed for two successive sheets. The directive sheet length Ln for the third-downstreammost sheet is adjustably set in such a manner as to allow a cut section LE located at the presumptive leading edge of the fourth-downstreammost sheet to come closer to a nearest one of the flute ridges located upstream with respect to the cut section LE.

When the correction flag Zb is not set to "1", a processing in the SC12 is performed. In the SC12, the preset order-specified sheet length L is set as a directive sheet length Ln. The lower-level management device 100 gives an instruction to designate this directive sheet length Ln (=L) as a directive sheet length Ln for the third-downstreammost sheet ST3, to the cutter control device 110. Further, the correction flag Zb is set to "1".

In the SC9, when the subtracted value (D−0.5P) is determined to be equal to or greater than the cutting error allowable value La (SC9: YES), a processing in the SC13 is performed. In the SC13, a value obtained by adding the preset order-specified sheet length L to one-half of the cutting error allowable value La is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "1". The directive sheet length Ln for the third-downstreammost sheet is adjustably set in such a manner as to allow a cut section LE located at the presumptive leading edge of the fourth-downstreammost sheet to come closer to a nearest one of the flute ridges located upstream with respect to the cut section LE.

After performing any of the SC6 to SC8 or any of the SC11 to SC13 are performed, the routine proceeds to SC14. In the SC14, the cut phase flag Bt is set to "1". After completion of the processing in the SC14, the routine returns to the SA8 illustrated in FIG. 3. In the SA8, it is determined whether the cutting under cutter control is completed. Specifically, it is determined whether or not the lower-level management device 100 receives a cutting completion signal SE regarding the second-downstreammost sheet, from the cutter control device 110, during a time period where the lower-level management device 100 controls the cutting operation for the corrugated paperboard PB, according to the directive sheet length Ln for the second-downstreammost sheet designated in the SA7. When it is determined that the cutting completion signal SE is received (SA8: YES), the routine proceeds to SA9. At a time point when the cutting completion signal SE is received, the second-downstreammost sheet is separated from the corrugated paperboard PB.

In the SA9, the lower-level management device 100 instructs the camera CA to image a region around the cut section LE of the corrugated paperboard PB. In this embodiment, the cut section LE corresponds to a leading edge of the corrugated paperboard PB after the second-downstreammost sheet is separated therefrom, i.e., a leading edge of the third-downstreammost sheet. Thus, a region around this leading edge within a range corresponding to at least one flute pitch is imaged. In SA10, image data obtained by the camera CA is supplied from the camera CA to the lower-level management device 100, wherein the image data is subjected to image processing for detecting the positional offset amount D.

In SB1 illustrated in FIG. 4, it is determined whether or not the cutting mode flag Bh is "0". The cutting mode flag Bh is set to "1" indicative of the half-pitch cutting mode, in the SA6. Thus, the cutting mode flag Bh is determined to be not "0" (SB1: NO), and the routine proceeds to the SC1 illustrated in FIG. 5. In the SC1, it is determined whether or not the cut phase flag Bt is "0". The cut phase flag Bt is set to "1" in the SC14. Thus, the cut phase flag Bt is determined to be not "0", and the routine proceeds to the SC3.

In the SC3, the cut phase flag Bt is set to "0", and the routine proceeds to the SB2 illustrated in FIG. 4. The processings in the SB2 to SB12 are the same as those in the operation to be performed by setting the preset order-specified sheet length L to 601 mm. In one of the SB5 to SB7 and SB10 to SB12 among the processing in the SB2 to SB12, a directive sheet length Ln for the fourth-downstreammost sheet is set. The directive sheet length Ln for the fourth-downstreammost sheet is adjustably set in such a manner as to allow a cut section LE located at a presumptive leading edge of a fifth-downstreammost sheet to come closer to a nearest one of the flute troughs located downstream with respect to the cut section LE.

In this embodiment, in the case where a half-pitch cutting mode for the preset order-specified sheet length L: 602 mm, is selected, a directive sheet length Ln for an even number-th downstreammost sheet such as a fourth-downstreammost sheet is adjustably set in such a manner as to allow a cut section LE located at a presumptive leading edge of the subsequent odd number-th downstreammost sheet to come closer to a nearest one of the flute troughs located upstream or downstream with respect to the cut section LE, according to the processings in the SB2 to SB12. Further, a directive sheet length Ln for an odd number-th downstreammost sheet such as a fifth-downstreammost sheet is adjustably set in such a manner as to allow a cut section LE located at a presumptive leading edge of the subsequent even number-th downstreammost sheet to come closer to a nearest one of the flute ridges located upstream or downstream with respect to the cut section LE, according to the processings in the SC1 to SC14.

(Operation in Case where Preset Order-Specified Sheet Length L is 604 mm)

As regards an order, the following description will be made on an assumption that a preset order-specified sheet length L designated by the upper-level management device 200 is 604 mm which is a length different from a value of an integral multiple of the flute pitch P. The operation to be performed by setting the preset order-specified sheet length L to 604 mm is partially the same as the operation to be performed by setting the preset order-specified sheet length L to 602 mm, and therefore only differences therebetween will be described.

In the SA2, the flute fraction Pa is calculated as 4 mm which a remainder as a result of dividing 604 mm by 6.0 mm.

In the SA3, it is determined whether or not a value (2 mm) obtained by subtracting the flute fraction Pa (=4 mm) from the flute pitch P (=6.0 mm) is equal to or less than the dimensional error allowable value Lz (=1 mm). The subtracted value is greater than the dimensional error allowable value Lz, and thus the routine proceeds to the SA5.

In the SA5, it is determined whether or not an absolute value (=1 mm) of a value (0.5P−Pa) obtained by subtracting the flute fraction Pa (=4 mm) from one-half (=3.0 mm) of the flute pitch P is equal to or less than the dimensional error allowable value Lz (=1 mm). The absolute value of the subtracted value is equal to or less than the dimensional error allowable value Lz, and thus the routine proceeds to the SA6.

In the SA6, the cutting mode flag Bh stored in the working memory 130 is set to "1", i.e., a half-pitch cutting mode for the preset order-specified sheet length L: 604 mm, is selected.

In the SA7, the lower-level management device 100 gives an instruction to designate the current order-specific preset order-specified sheet length L: 604 mm, as a directive sheet length Ln for a second-downstreammost sheet ST2, to the cutter control device 110. In the SA8, it is determined whether or not the lower-level management device 100 receives a cutting completion signal SE regarding the downstreammost sheet, from the cutter control device 110, during a time period where the lower-level management device 100 controls the cutting operation for the corrugated paperboard PB, according to the directive sheet length Ln for the downstreammost sheet. The cut section LE corresponds to a leading edge of the corrugated paperboard PB after the downstreammost sheet is separated therefrom, i.e., a leading edge of the second-downstreammost sheet. Thus, in the SA9, a region around this leading edge within a range corresponding to at least one flute pitch is imaged.

After performing the processings in the SA9 and SA10, the processing in the SB 1 illustrated in FIG. 4 is performed. In the SB1, it is determined whether or not the cutting mode flag Bh is "0". The cutting mode flag Bh is set to "1" in the SA6. Thus, the cutting mode flag Bh is determined to be not "0" (SB1: NO), and the routine proceeds to the SC1 illustrated in FIG. 5.

As regards the processings in the SC1 and the subsequent steps, the operation to be performed by setting the preset order-specified sheet length to 604 mm is the same as the operation to be performed by setting the preset order-specified sheet length to 602 mm. As regards orders for producing and cutting a B-flute corrugated paperboard PB, assume that one of 602 mm, 603 mm and 604 falling within the range of 600 mm to 606 mm is designated as the preset order-specified sheet length L. In this case, in the SA6, the half-pitch cutting mode is selected, and a directive sheet length Ln is set on a per-sheet basis in such a manner as to allow the cut section LE to come closer to a nearest one of the flute troughs and flute ridges located upstream or downstream with respect to the cut section LE.

<Cutting Operation for a-Flute Corrugated Paperboard>

Next, the operation and functions of the cutoff system will be described on an assumption that an order for producing and cutting an A-flute corrugated paperboard is implemented. Generally, A-flute has a flute pitch of 8.8 mm. As regards an order, the following description will be made on an assumption that a preset order-specified sheet length L designated by the upper-level management device 200 is different from a value of an integral multiple of the flute pitch P.

(Operation in Case where Preset Order-Specified Sheet Length L is 882 mm)

As regards an order, the following description will be made on an assumption that a preset order-specified sheet length L designated by the upper-level management device 200 is 882 mm which is a length different from a value of an integral multiple of the flute pitch P. Upon start of execution of the directive sheet length setting routine, in the SA1 illustrated in FIG. 3, an initial setting is performed. Specifically, the flute pitch P is set to 8.8 mm which is a flute pitch of an A-flute corrugated paperboard PB to be cut according to a current order. A current preset order-specified directive sheet length L, i.e., 882 mm, is set as a directive sheet length Ln, and the lower-level management device 100 gives an instruction to designate this directive sheet length Ln as a directive sheet length Ln for a downstreammost sheet, to the cutter control device 110. A correction flag Zb stored in the working memory 130 is set to "1", and a cut phase flag Bt stored in the working memory 130 is set to "0". The cutter control device 110 starts to control the motor speed of the motor 15 according to the directive sheet length Ln (=L) for the downstreammost sheet.

In SA2, a flute fraction Pa is calculated. Specifically, the flute fraction Pa is a remainder as a result of dividing the directive sheet length L by the flute pitch P. In this embodiment, a remainder as a result of dividing 882 mm by 8.8 mm is 2 mm.

In SA3, it is determined whether or not the flute fraction Pa is equal to or less than the dimensional error allowable value Lz, or whether or not a value (P−Pa) obtained by subtracting the flute fraction Pa from the flute pitch P is equal to or less than the dimensional error allowable value Lz. In this embodiment, a value of 1.5 mm for A-flute of the current order is read from the program memory 120 and set as the dimensional error allowable value Lz. At this moment, the flute fraction Pa (=2 mm) is greater than the dimensional error allowable value Lz, so that the routine proceeds to the SA5.

In the SA5, it is determined whether or not an absolute value of a value obtained by subtracting the flute fraction Pa from one-half of the flute pitch P is equal to or less than the dimensional error allowable value Lz. In this embodiment, the absolute value of the subtracted value (0.5P−Pa) is 2.4 mm. Thus, in the SA5, the absolute value of the value obtained by subtracting the flute fraction Pa from one-half of the flute pitch P is determined to be neither equal to nor less than the dimensional error allowable value Lz, and the directive sheet length setting routine is terminated. As a result, in the case where the preset order-specified sheet length L is 882 mm, the lower-level management device 100 gives an instruction to designate the preset order-specified sheet length L: 882 mm, as a directive sheet length, to the cutter control device 110.

(Operation in Cases Other than Case where Preset Order-Specified Sheet Length L is 882 mm)

As regards orders for producing and cutting an A-flute corrugated paperboard PB, assume that one of 883 mm, 886 mm and 887 falling within the range of 880 mm to 889 mm is designated as the preset order-specified sheet length L. In this case, as with the case where the preset order-specified sheet length L is 882, in the SA5, the absolute value of the value obtained by subtracting the flute fraction Pa from one-half of the flute pitch P is determined to be neither equal to nor less than the dimensional error allowable value Lz, and the directive sheet length setting routine is terminated. Further, assume that one of 880 mm, 881 mm, 888 mm and 889 falling within the range of 880 mm to 889 mm is designated as the preset order-specified sheet length L. In this case, in the SA3, the flute fraction Pa or the value (P−Pa) obtained by subtracting the flute fraction Pa from the flute pitch P is determined to be equal to or less than the dimensional error allowable value Lz (SA3: YES), and the full-pitch cutting mode is selected in the SA4. As a result of the selection of the full-pitch cutting mode, the processings in the SB2 to SB 12 are repeatedly performed. Furthermore, assume that one of 884 mm and 885 mm falling within the range of 880 mm to 889 mm is designated as the preset order-specified sheet length L. In this case, in the SA3, the flute fraction Pa or the value (P−Pa) obtained by subtracting the flute fraction Pa from the flute pitch P is determined to be neither equal to nor less than the dimensional error allowable value Lz (SA3: NO). Then, in the SA4, the absolute value of the value obtained by subtracting the flute fraction Pa from one-half of the flute pitch P is determined to be equal to or less than the dimensional error allowable value Lz, and the processing in the SA6 is performed. In the SA6, the half-pitch cutting mode is selected. As a result of the selection of the half-pitch cutting mode, the processings in the SC1 to SC14 are repeatedly performed.

<<Advantageous Effects of First Embodiment>>

In the first embodiment, when the full-pitch cutting mode is selected (Bh=0), a directive sheet length Ln is adjustably set in such a manner as to allow a cut section LE of the corrugated paperboard PB to come closer to a nearest one of the flute troughs located upstream or downstream with respect to the cut section LE. This makes it possible to uniform a flute arrangement state in each corrugated paperboard sheet. On the other hand, when the half-pitch cutting mode is selected (Bh=1), a directive sheet length Ln is adjustably set in such a manner as to allow a cut section LE of the corrugated paperboard PB to alternately come closer to a nearest one of the flute ridges and a nearest one of the flute troughs located upstream or downstream with respect to the cut section LE, so that a flute arrangement state in each corrugated paperboard sheet can be uniformed when resulting corrugated paperboard sheets are alternately turned back to front with respect to the conveyance direction FD. Therefore, in a corrugated paperboard box making machine, such a flute arrangement state makes it possible to uniform a region to be subjected to processing such as creasing in each corrugated paperboard sheet, and thus accurately bend the corrugated paperboard sheet.

In the first embodiment, a cut section LE of a corrugated paperboard PB subjected to cutting can be imaged using the camera CA to allow the lower-level management device 100 to detect a flute arrangement state, i.e., the positional offset amount D, in an actual cut section LE. This makes it possible to set a subsequent directive sheet length Ln, while taking into account the positional offset amount D, in addition to other influence factors to a position of the cut section LE, such as conveyance error in the corrugated paperboard.

In the first embodiment, one of the positional offset amount D and the subtracted value (P−D), or one of the subtracted value (D−0.5P) and the subtracted value (0.5P−D), is compared to the cutting error allowable value La. When the positional offset amount D or the subtracted value is less than the cutting error allowable value La, a value obtained by multiplying the positional offset amount D or the subtracted value by the correction value Va is added to or subtracted from a preset order-specified sheet length L. On the other hand, when the positional offset amount D or the subtracted value is greater than the cutting error allowable value La, a constant value of one-half of the cutting error allowable value La is added to or subtracted from a preset order-specified sheet length L. Thus, as compared to the case where the positional offset amount D or the subtracted value is directly added to or subtracted from a preset order-specified sheet length L, it becomes possible to allow a position of a cut section LE to gradually come closer to a flute ridge or trough without sharply changing a directive sheet length Ln.

In the first embodiment, when the positional offset amount D or the subtracted value is less than the cutting error allowable value La, i.e., a position of a cut section LE imaged by the camera CA is fairly close to flute ridge or trough, the content of the correction flag Zb is switched to alternately perform a processing of adding or subtracting the value obtained by multiplying the positional offset amount D or the subtracted value by the correction value Va to or from a preset order-specified sheet length L, so as to set a directive sheet length Ln, and a processing of setting a preset order-specified sheet length L as a directive sheet length Ln. This makes it possible to prevent an excessive change in the directive sheet length Ln by successively adding or subtracting the value obtained by multiplying the positional offset amount D or the subtracted value by the correction value Va.

Second Embodiment

With reference to the drawings, the present invention will further be described based on a cutoff system 1 according to a second embodiment thereof. A positional offset amount Dw in the second embodiment is different from the positional offset amount D in the first embodiment, in terms of a determination process thereof. Thus, only a difference in this point will be described. In the following description about the second embodiment, the same element or component as that in the first embodiment is assigned with the same reference numeral or mark.

<<General Configuration and Electrical Configuration>>

As regards a general mechanical configuration, the second embodiment has the configuration illustrated in FIG. 1. Further, as regards an electrical configuration, the second embodiment has approximately the same configuration as that illustrated in FIG. 2, except a directive sheet length setting routine stored in a program memory 120. The direc- tive sheet length setting routine in the second embodiment is executed according to the flowcharts illustrated in FIGS. 14 to 16. Processing in each step illustrated in the flowchart is performed by the lower-level management device 100.

The directive sheet length setting routine in the second embodiment is provided by adding a new step SA11 to the directive sheet length setting routine in the first embodiment. A positional offset amount Dw calculated in the SA 11 is used in place of the positional offset amount D. Any step using the positional offset amount Dw in place of the positional offset amount D is denoted by adding W to a mark representing each step of the directive sheet length setting routine in the first embodiment. For example, the step SB2 of the directive sheet length setting routine in the first embodiment is denoted as SB2W in the directive sheet length setting routine in the second embodiment.

Figure 17:
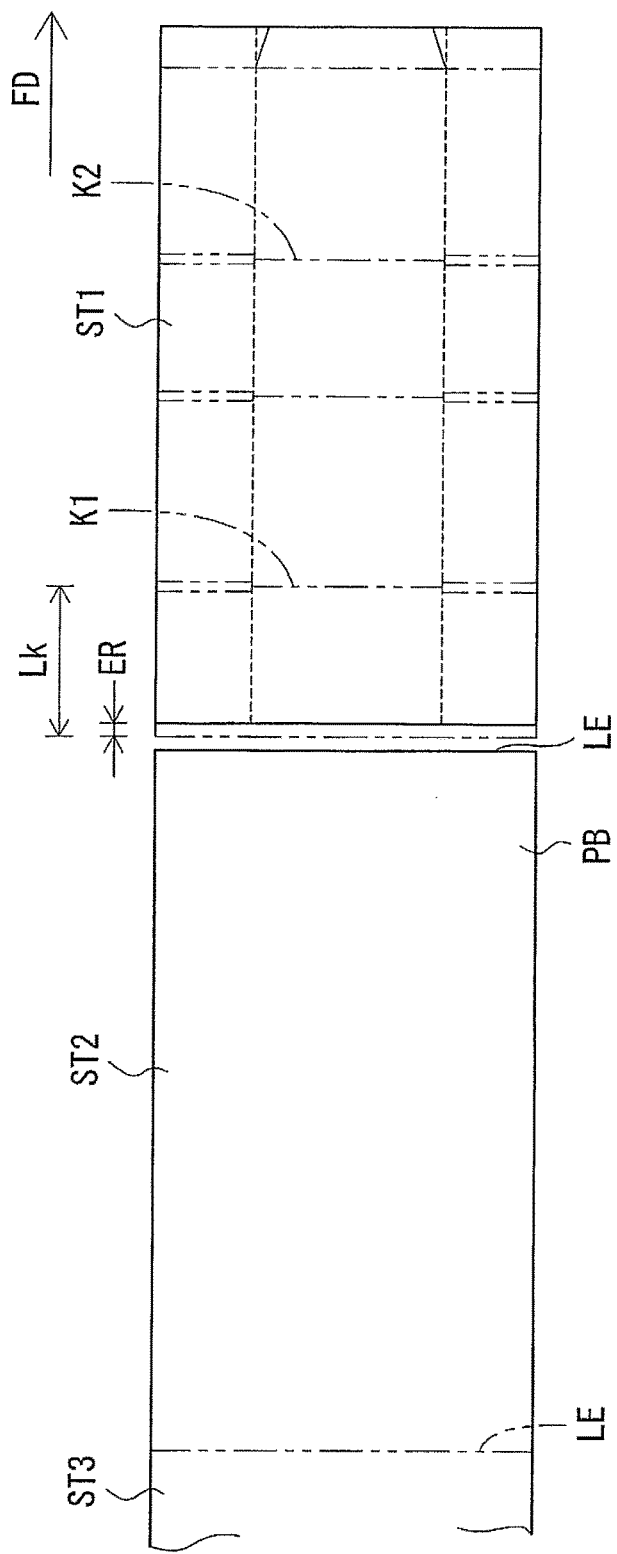
FIG. 17 is an explanatory diagram illustrating a downstreammost sheet ST1 in which a crease line K1 is formed at a position away from an edge thereof by an edge-to-crease line distance Lk, and a subsequent corrugated paperboard PB.
Figure 18:
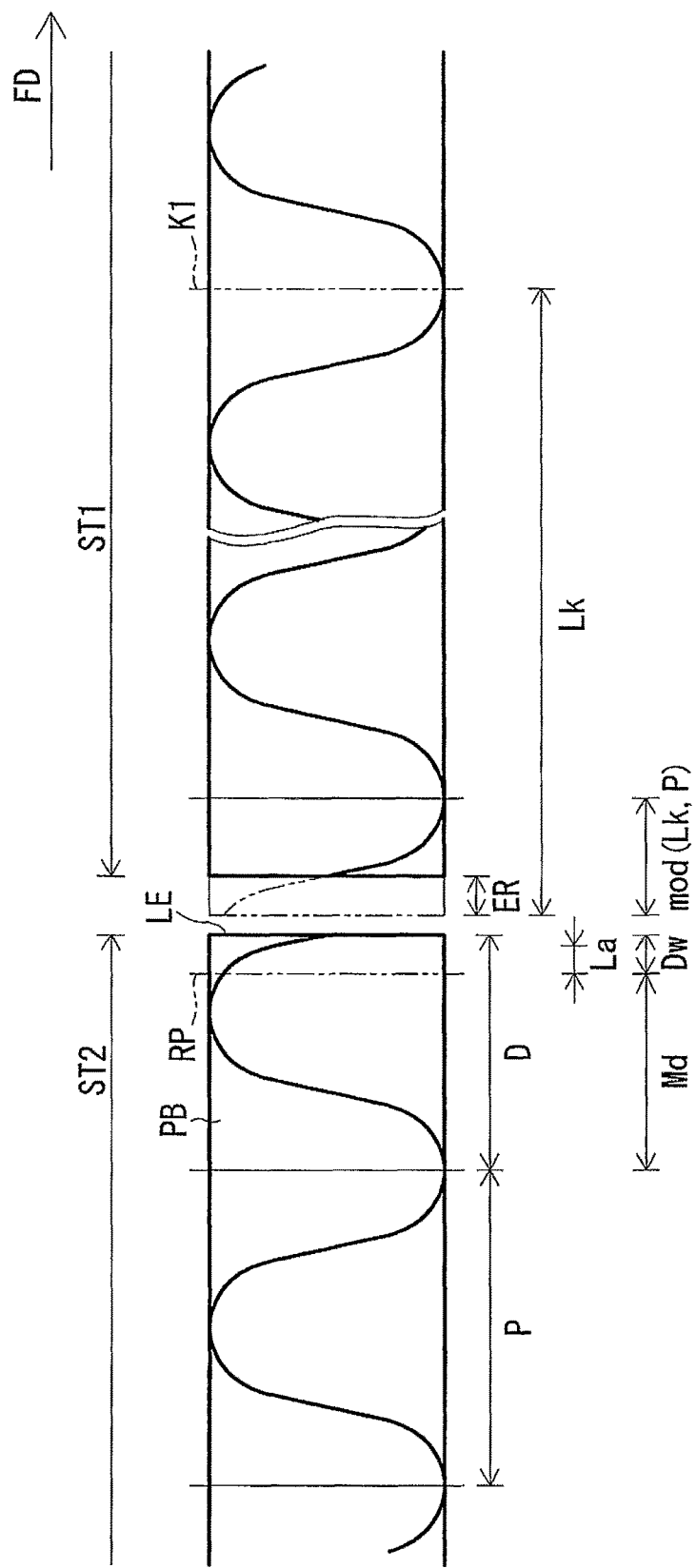
FIG. 18 is an explanatory diagram illustrating a relationship between the edge-to-crease line distance Lk and a remainder mod (Lk, P) in the downstreammost sheet ST1, and a relationship between a cut-section displacement amount Md and each of the positional offset amount D and a positional offset amount Dw in a second-downstreammost sheet ST2.

In the second embodiment, a lower-level management device 100 is configured to receive a preset order-specified cut deviation amount Md as one of various control instruc- tion information delivered from an upper-level management device 200, and store the cut deviation amount Md in a working memory 130. The cut deviation amount Md is expressed as Md=P−mod (Lk, P), i.e., a value obtained by subtracting, from a flute pitch P, a remainder as a result of dividing an edge-to-crease line distance Lk by the flute pitch P. A creaser unit of a corrugated paperboard box making machine is configured to form a crease line extending along a flute rough or flute ridge of a corrugated paperboard sheet. The edge-to-crease line distance Lk means a distance between a position of the crease line and an edge of the corrugated paperboard sheet in a direction perpendicular to a direction along which the flute rough or flute ridge extends. FIG. 17 illustrates a downstreammost sheet ST1 which is a corrugated paperboard sheet firstly cut and separated from a corrugated paperboard PB. A conveyance direction FD illus- trated in FIG. 17 is a direction along which the corrugated paperboard PB is conveyed in a corrugating machine, and a direction along which a corrugated paperboard sheet is conveyed in the corrugated paperboard box making machine is perpendicular to the conveyance direction FD illustrated in FIG. 17. In the downstreammost sheet ST1, a plurality of crease and score lines including a presumptive crease line to be formed by the creaser unit of the corrugated paperboard box making machine A creasing position of a crease line K1 is set to be located away from an upstream edge of the downstreammost sheet ST1 by the edge-to-crease line dis- tance Lk. FIG. 18 enlargedly illustrates a flute arrangement state in the downstreammost sheet ST1 and the corrugated paperboard PB. As illustrated in FIG. 18, the creasing position of the crease line K1 is preferably located in a flute trough of the downstreammost sheet ST1, in view of bend- ing accuracy. In the case where the creasing position of the crease line K1 is located in the flute trough, a distance between the upstream edge of the downstreammost sheet ST1 and a nearest one of the flute troughs located down- stream with respect to the upstream edge is expressed as mod (Lk, P). For example, assuming that corrugated paper- board PB is the type of B-flute, and a preset order-specified sheet length L and the edge-to-crease line distance Lk are, respectively, 601 mm and 110 mm, the mod (Lk, P) is 2 mm which is a remainder as a result of dividing the edge-to- crease line distance Lk (=110 mm) by the flute pitch P (=6.0 mm). The cut deviation amount Md is 4 mm which is obtained by subtracting the remainder (=2 mm) from the flute pitch P (=6.0 mm).

Meanwhile a dimensional error practically occurs due to various factors such as conveyance error. In the example illustrated in FIG. 17, the creasing position of the crease line K1 is located at a position away from the upstream edge of the downstreammost corrugated paperboard sheet ST1 by a distance (Lk−ER) obtained by subtracting a dimensional error ER from the edge-to-crease line distance Lk. If no dimensional error ER occurs, a cut section LE of the corrugated paperboard PB, i.e., a leading edge of the second-downstreammost sheet ST2, is at a reference position RP away from a nearest one of the flute troughs upstream with respect to the cut section LE by the cut deviation amount Md. However, due to occurrence of the dimensional error ER, the cut section LE of the corrugated paperboard PB is located at a position away from a nearest one of the flute troughs located upstream with respect to the cut section LE, by a positional offset amount D.

<<Operation and Functions of Second Embodiment>>

Figure 14:
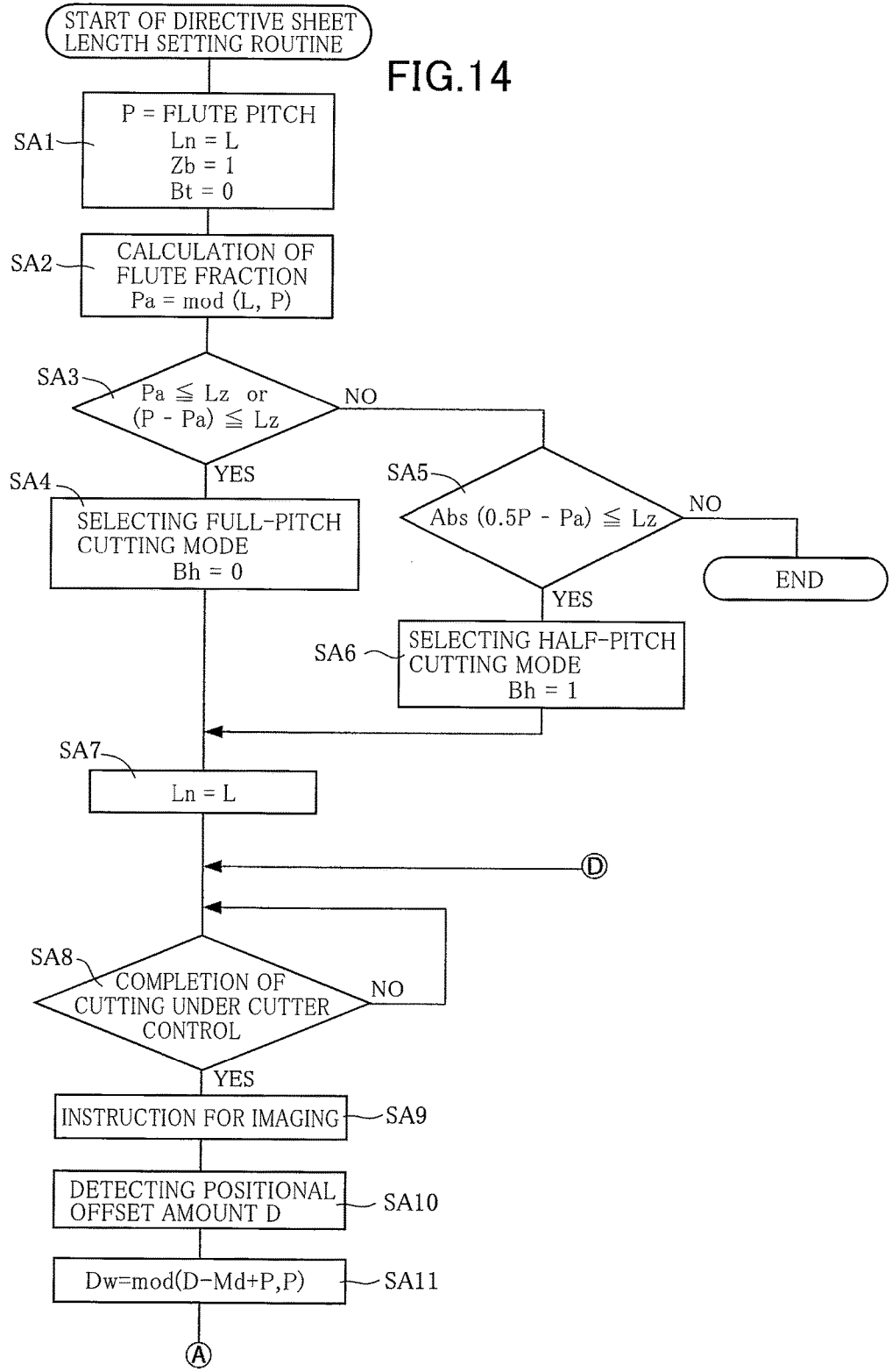
FIG. 14 is a flowchart illustrating a first processing region of a directive sheet length setting routine to be executed by a lower-level management device of a cutoff system according to a second embodiment of the present invention.
Figure 15:
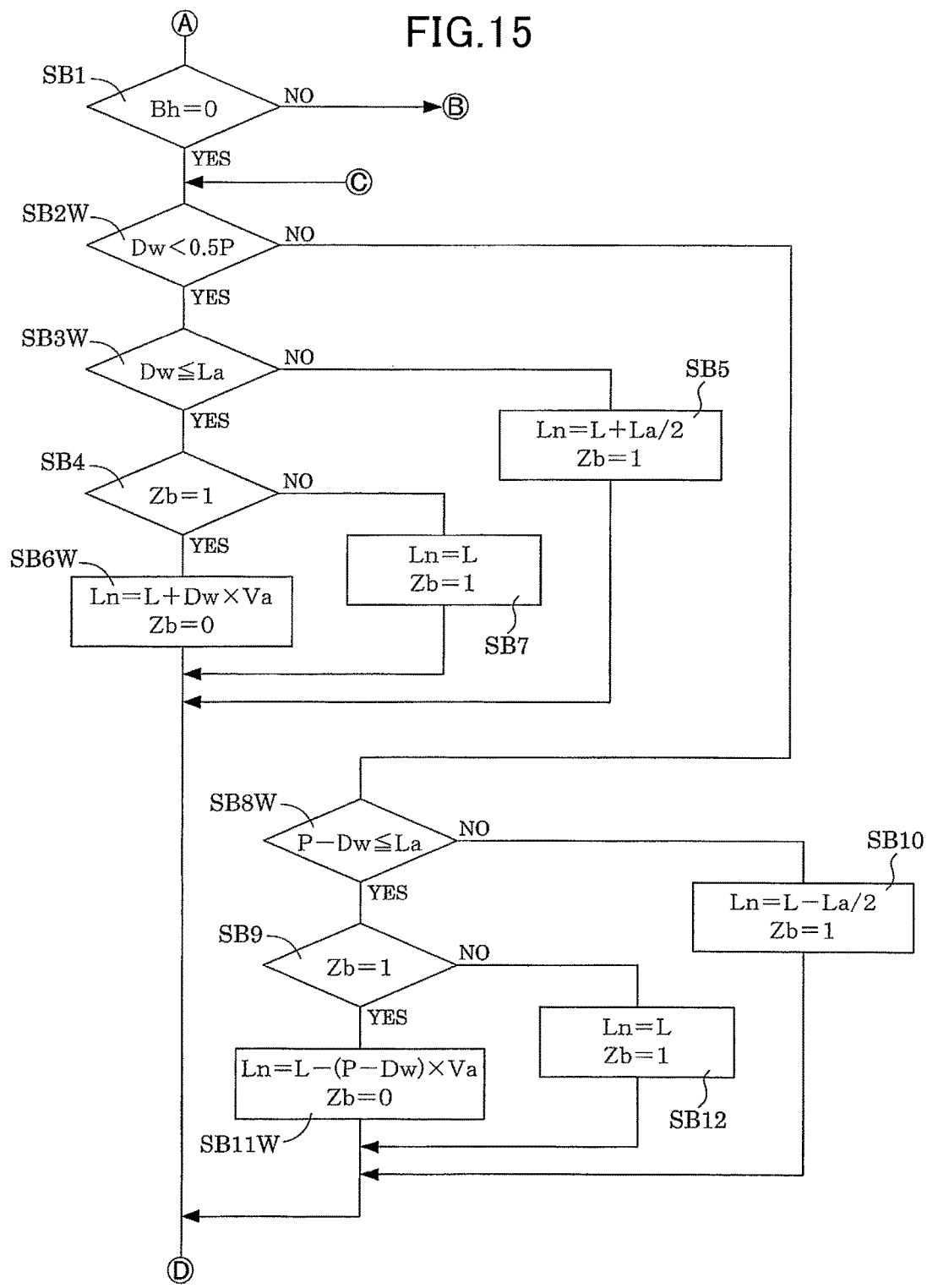
FIG. 15 is a flowchart illustrating a second processing region of the directive sheet length setting routine.
Figure 16:
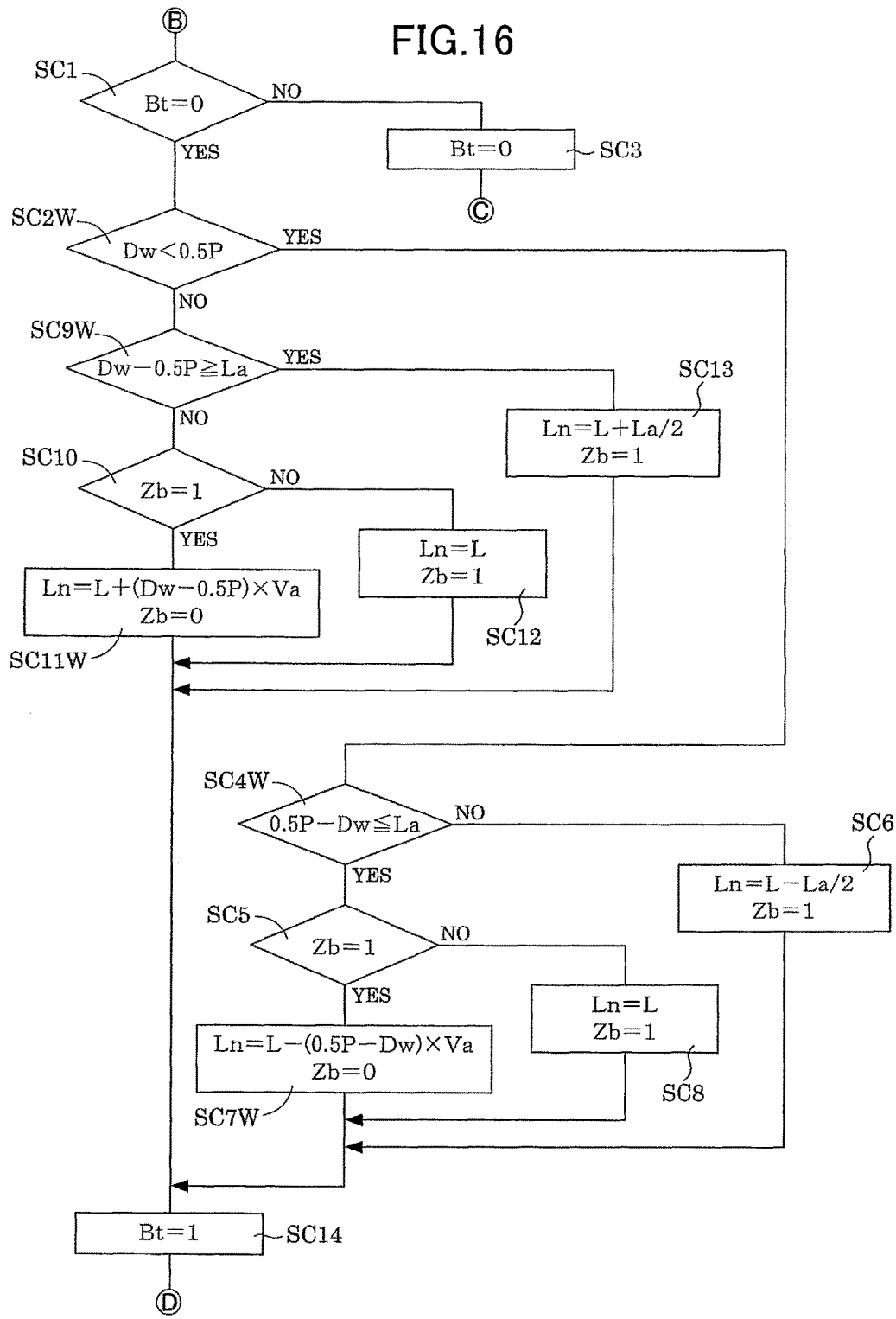
FIG. 16 is a flowchart illustrating a third processing region of the directive sheet length setting routine.

An operation and functions of the cutoff system according to the second embodiment will be described below, with reference to the drawings. The directive sheet length setting routine in the second embodiment illustrated in FIGS. 14 to 16 is different from the directive sheet length setting routine in the first embodiment, in terms of the step SA11 and the steps added with W, and thus such different steps will be mainly described.

<Cutting Operation for B-Flute Corrugated Paperboard Pb>

The operation and functions of the cutoff system will be described on an assumption that an order for producing and cutting a B-flute corrugated paperboard is implemented. As with the first embodiment, as regards an order, the following description will be made on an assumption that the preset order-specified sheet length L designated by the upper-level management device 200 is 601 mm and 602 mm each of which is different from a value of an integral multiple of the flute pitch P. In the second embodiment, a directive sheet length Ln is adjustably set in such a manner as to allow a cut section LE to come close to a reference position RP located upstream or downstream of the cut section LE, or a position RRP away from the reference position RP on a downstream side by one-half of the flute pitch P. As regards a distance corresponding to a preset reference flute arrangement phase, when processings in SB2W to SB12 illustrated in FIG. 15 are performed, the reference position RP is used as an original (zero) point, so that a distance from a nearest one of the flute troughs located upstream with respect to the cut section LE is set as the cut deviation amount Md. On the other hand, when processings in SC1 to SC14 illustrated in FIG. 16 are performed, the position RRP is used as an original (zero) point, so that a distance from the nearest trough is set as a total value of the cut deviation amount Md and one-half of the flute pitch P.

(Operation in Case where Preset Order-Specified Sheet Length L is 601 mm)

When an operator manually operates an order start button 141, a directive sheet length setting routine illustrated in FIGS. 14 to 16 is started. The lower-level management device 100 receives control instruction information including a preset order-specified sheet length L indicative of 601 mm, and calculates a flute fraction Pa in SA2. The flute fraction Pa is 1 mm, and thus is determined to be equal to or less than a dimensional error allowable value Lz (=1 mm) (SA3: YES). In SA 4, a cutting mode flag Bh is set to "0", i.e., a full-pitch cutting mode for the preset order-specified sheet length L (=601 mm) is selected.

In SA9, a cut section LE, i.e., a reading edge of the second-downstreammost sheet ST2, is imaged to detect a positional offset amount D illustrated in FIG. 18.

In SA11, a positional offset amount Dw is calculated. The positional offset amount D in the first embodiment is a distance from a reference position, i.e., a nearest one of the flute troughs located upstream with respect to the cut section LE, to the cut section LE. On the other hand, the positional offset amount Dw in the second embodiment is a distance (D−Md) from a reference position RP away from a nearest one of the flute troughs located upstream with respect to the cut section LE by the cut deviation amount Md, to the cut section LE, or a value (P+D−Md) obtained by subtracting the cut deviation amount Md from a total value of the positional offset amount D and the flute pitch P. The positional offset amount Dw is calculated from the following formula: Dw=mod (D−Md+P, P).

In the SA4, the full-pitch cutting mode is selected as mentioned above, so that steps SB2W to SB12 are repeatedly performed. In the example illustrated in FIG. 18, in the SB2W, the positional offset amount Dw is determined to be less than one-half of the flute pitch P (SB2W: YES), and then a processing in the SB3W is performed. In the SB3W, the positional offset amount Dw is determined to be neither equal to nor less than a cutting error allowable value La (=1 mm) (SB3W: NO), and then a processing in the SB5 is performed. In the SB5, a value obtained by adding the preset order-specified sheet length L to one-half of the cutting error allowable value La is set as a directive sheet length Ln. The lower-level management device 100 gives an instruction to designate this directive sheet length Ln as a directive sheet length Ln for a third-downstreammost sheet ST3, to a cutter control device 110. Further, the correction flag Zb is set to "1". According to the processing in the SB5, the directive sheet length Ln for the third-downstreammost sheet is adjustably set in such a manner as to allow a cut section LE located at a presumptive leading edge of a fourth-downstreammost sheet to come closer to a reference position RP located upstream of the cut section LE.

Figure 19:
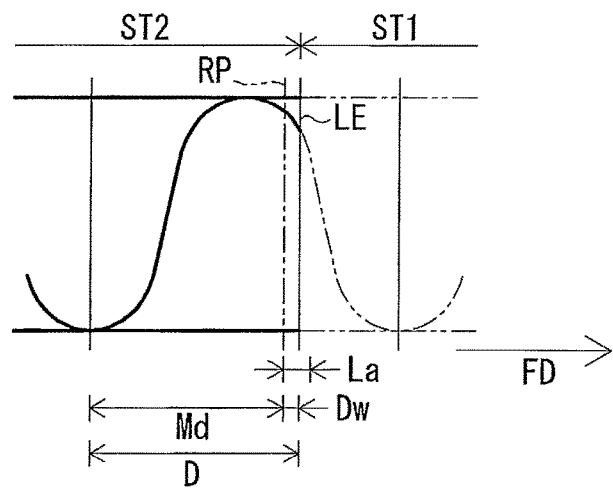
FIG. 19 is an explanatory diagram illustrating a cut section LE obtained under selection of the full-pitch cutting mode, wherein the positional offset amount Dw is less than one-half of the flute pitch P, and is equal to or less than the dimensional error allowable value La.

In the example illustrated in FIG. 19, in the SB2W, the positional offset amount Dw is determined to be less than one-half of the flute pitch P (SB2W: YES), and then the processing in the SB3W is performed. In the SB3W, the positional offset amount Dw is determined to be equal to or less than the cutting error allowable value La (=1 mm) (SB3W: YES), and then a processing in the SB4 is performed. In the SA1, a correction flag Zb is set to "1". Thus, in the SB4, the correction flag Zb is determined to be "1" (SB4: YES), and a processing in the SB6W is performed. In the SB6W, a value obtained by adding the preset order-specified sheet length L to a value (D×Va) obtained by multiplying the positional offset amount Dw by a correction value Va is set as a directive sheet length Ln. The lower-level management device 100 gives an instruction to designate this directive sheet length Ln as a directive sheet length Ln for a third-downstreammost sheet ST3, to the cutter control device 110. Further, the correction flag Zb is set to "0". A reason why the correction flag Zb is set to "0" is to avoid a situation where the SB6W is successively performed for two successive sheets. According to the processing in the SB6W, the directive sheet length Ln for the third-downstreammost sheet is adjustably set in such a manner as to allow a cut section LE located at a presumptive leading edge of a fourth-downstreammost sheet to come closer to the reference position RP located upstream of the cut section LE.

Figure 20:
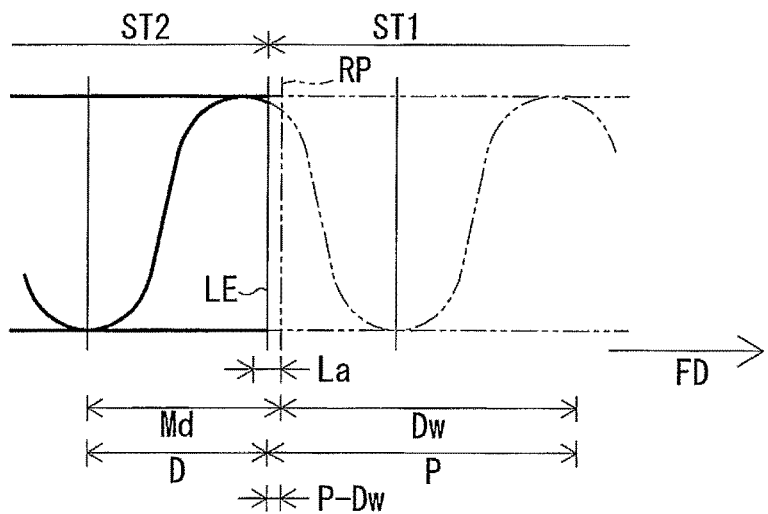
FIG. 20 is an explanatory diagram illustrating a cut section LE obtained under selection of the full-pitch cutting mode, wherein a subtracted value (P−Dw) is equal to or less than the dimensional error allowable value La.

In the example illustrated in FIG. 20, in the SB2W, the positional offset amount Dw is determined to be not less than one-half of the flute pitch P (SB2W: NO), and then a processing in the SB8W is performed. In the SB8W, it is determined whether or not a value (P−Dw) obtained by subtracting the positional offset amount Dw from the flute pitch P is equal to or less than the cutting error allowable value La. When the subtracted value (P−Dw) is determined to be equal to or less than the cutting error allowable value La (SB8: YES), the routine proceeds to SB9. In the SA1, the correction flag Zb is set to "1", as mentioned above. Thus, in the SB9, the correction flag Zb is determined to be "1" (SB9: YES), and a processing in the SB11W is performed. In the SB11, a value [(P−Dw)×Va] obtained by multiplying the subtracted value (P−Dw) by the correction value Va is derived, and a value obtained by subtracting the derived value [(P−Dw)×Va] from the preset order-specified sheet length L is set as a directive sheet length Ln. The lower-level management device 100 gives an instruction to designate this directive sheet length Ln, as a directive sheet length Ln for the third-downstreammost sheet ST3, to the cutter control device 110. Further, the correction flag Zb is set to "0". According to the processing in the SB11W, the directive sheet length Ln for the third-downstreammost sheet is adjustably set in such a manner as to allow a cut section LE located at a presumptive leading edge of the fourth-downstreammost sheet to come closer to the reference position RP upstream of the cut section LE.

Figure 21:
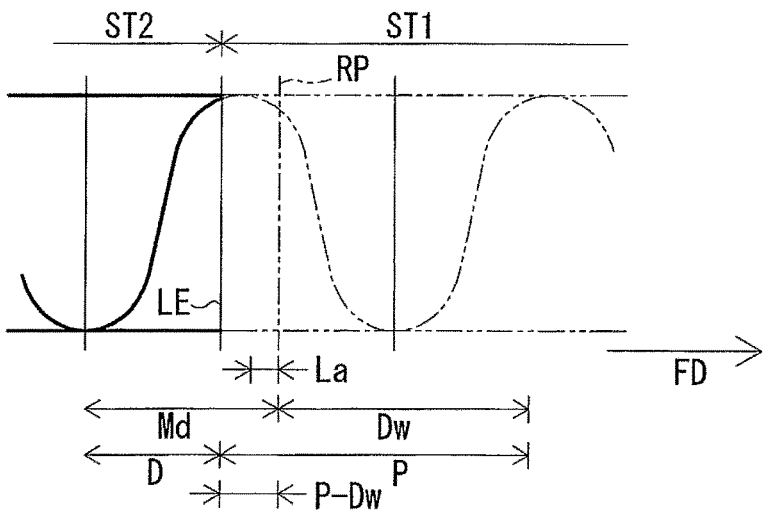
FIG. 21 is an explanatory diagram illustrating a cut section LE obtained under selection of the full-pitch cutting mode, wherein the subtracted value (P−Dw) is greater than the dimensional error allowable value La.

In the example illustrated in FIG. 21, in the SB2W, the positional offset amount Dw is determined to be not less than one-half of the flute pitch P (SB2W: NO), and then a processing in the SB8W is performed. In the SB8W, the value (P−Dw) obtained by subtracting the positional offset amount Dw from the flute pitch P is determined to be neither equal to nor less than the cutting error allowable value La, and a processing in the SB10 is performed. In the SB10, a value obtained by subtracting one-half of the cutting error allowable value La from the preset order-specified sheet length L is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "1". According to the processing in the SB10, the directive sheet length Ln for the third-downstreammost sheet is adjustably set in such a manner as to allow a cut section LE located at a presumptive leading edge of the fourth-downstreammost sheet to come closer to the reference position RP upstream of the cut section LE.

(Operation in Case where Preset Order-Specified Sheet Length L is 602 mm)

When an operator manually operates an order start button 141, a directive sheet length setting routine illustrated in FIGS. 14 to 16 is started. The lower-level management device 100 receives control instruction information including a preset order-specified sheet length L indicative of 602 mm, and calculates the flute fraction Pa in SA2. The flute fraction Pa is 2 mm, and thus is determined to be neither equal to nor less than the dimensional error allowable value Lz (=1 mm) (SA3: NO). In the SA5, it is determined whether or not an absolute value of a value obtained by subtracting the flute fraction Pa from one-half of the flute pitch P is equal to or less than the dimensional error allowable value Lz. In this example, the absolute value (=1 mm) is determined to be equal to or less than the dimensional error allowable value Lz (SA5: YES), and a processing in the SA6 is performed. In the SA6, the cutting mode flag Bh is set to "1", i.e., a half-pitch cutting mode for the preset order-specified sheet length L (=602 mm) is selected.

In the SA9, a region around the leading edge of the second-downstreammost sheet ST2 is imaged, and, in the SA10, the positional offset amount D is detected. Then, after completion of the processing in the SA10, a processing in the SA11 is performed.

In the SA11, the positional offset amount Dw is detected. The positional offset amount Dw is calculated from the following formula: Dw=mod (D−Md+P, P). In the example illustrated in FIG. 22, the positional offset amount Dw is a value (D−Md) obtained by subtracting the cut deviation amount Md from the positional offset amount D.

In the SA6, the half-pitch cutting mode is selected as mentioned above, so that steps SB2W to SB12 illustrated in FIG. 15 and steps SC1 to SC14 illustrated in FIG. 16 are repeatedly performed. In the SA1, a cut phase flag Bt is set to "0". Thus, in the SC1, the cut phase flag Bt is determined to be "0" (SC1: YES), and a processing in the SC2W is performed. In the example illustrated in FIG. 22, in the SC2W, the positional offset amount D is determined to be less than one-half of the flute pitch P (SC2W: YES), and a processing in the SC4W is performed. In the SC4W, it is determined whether or not a value (0.5P−Dw) obtained by subtracting the positional offset amount Dw from one-half of the flute pitch P is equal to or less than the cutting error allowable value La. The subtracted value (0.5P−Dw) is determined to be neither equal to nor less than the cutting error allowable value La (SC4W: NO), and the routine proceeds to SC6. In the SC6, a value obtained by subtracting one-half of the cutting error allowable value La from the preset order-specified sheet length L is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "1". According to the processing in the SC6, the directive sheet length Ln for the third-downstreammost sheet is adjustably set in such a manner as to allow a cut section LE located at a presumptive leading edge of the fourth-downstreammost sheet to come closer to a position RRP located downstream of the cut section LE. The position RRP is a position away from the reference position RP away from a nearest one of the flute troughs located upstream with respect to the cut section LE by the cut deviation amount Md, toward a downstream side by one-half of the flute pitch P.

Figure 23:
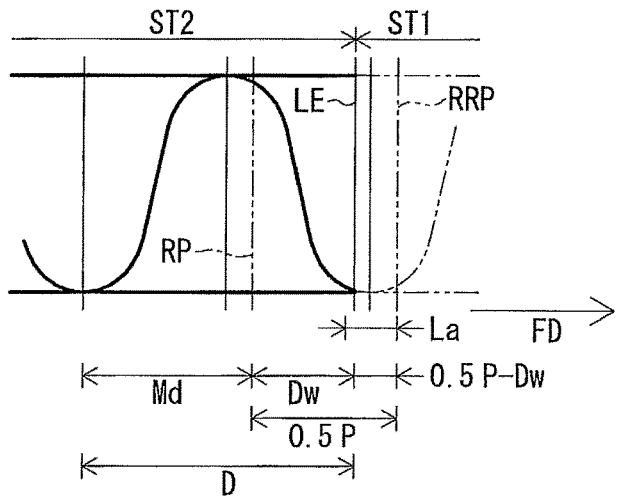
FIG. 23 is an explanatory diagram illustrating a cut section LE obtained under selection of the half-pitch cutting mode, wherein the subtracted value (0.5P−Dw) is equal to or less than the dimensional error allowable value La.

In the example illustrated in FIG. 23, in the SC2W, the positional offset amount Dw is determined to be less than one-half of the flute pitch P (SC2: YES), and a processing in the SC4W is performed. In the SC4W, the above subtracted value (0.5P−D) is determined to be equal to or less than the cutting error allowable value La (SC4W: YES), and the routine proceeds to the SC5. In the SC5, it is determined whether or not the correction flag Zb is "1". At this moment, the correction flag Zb is set to "1" in the SA1. Thus, the routine proceeds to the SC7W. In the SC7W, a value [(0.5P−Dw)×Va] obtained by multiplying the subtracted value (0.5P−Dw) by the correction value Va is derived, and a value obtained by subtracting the derived value [(0.5P−Dw)×Va] from the preset order-specified sheet length L is set as a directive sheet length Ln. The lower-level management device 100 gives an instruction to designate this directive sheet length Ln, as a directive sheet length Ln for the third-downstreammost sheet ST3, to the cutter control device 110. Further, the correction flag Zb is set to "0". According to the processing in the SC7W, the directive sheet length Ln for the third-downstreammost sheet is adjustably set in such a manner as to allow a cut section LE located at a presumptive leading edge of the fourth-downstreammost sheet to come closer to the position RRP located downstream of the cut section LE.

Figure 24:
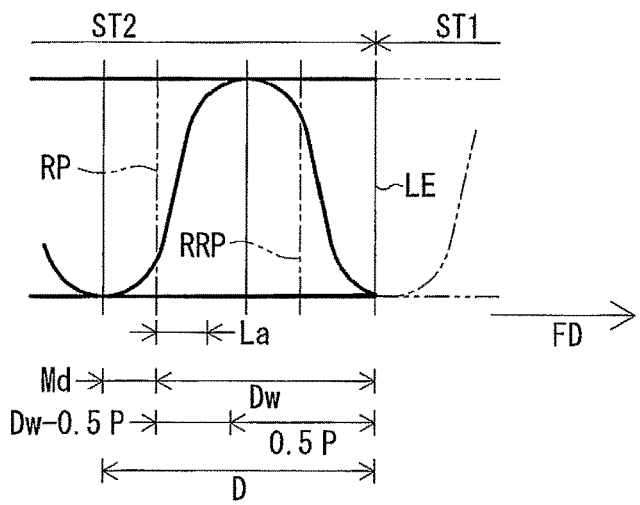
FIG. 24 is an explanatory diagram illustrating a cut section LE obtained under selection of the half-pitch cutting mode, wherein the subtracted value (0.5P−Dw) is greater than the dimensional error allowable value La.

In the example illustrated in FIG. 24, in the SC2W, the positional offset amount Dw is determined to be not less than one-half of the flute pitch P (SC2W: NO), and a processing in the SC9W is performed. In the SC9W, a value (Dw−0.5P) obtained by subtracting one-half of the flute pitch P from the positional offset amount Dw is derived, and it is determined whether or not the subtracted value is equal to or greater than the cutting error allowable value La. The subtracted value (Dw−0.5P) is determined to be equal to or greater than the cutting error allowable value La (SC9W: YES), and the routine proceeds to SC13. In the SC13, a value obtained by adding the preset order-specified sheet length L to one-half of the cutting error allowable value La is set as a directive sheet length Ln. The lower-level management device 100 gives an instruction to designate this directive sheet length Ln as a directive sheet length Ln for the third-downstreammost sheet ST3, to the cutter control device 110. Further, the correction flag Zb is set to "1". According to the processing in the SC13, the directive sheet length Ln for the third-downstreammost sheet is adjustably set in such a manner as to allow a cut section LE located at a presumptive leading edge of the fourth-downstreammost sheet to come closer to a position RRP located upstream of the cut section LE.

Figure 25:
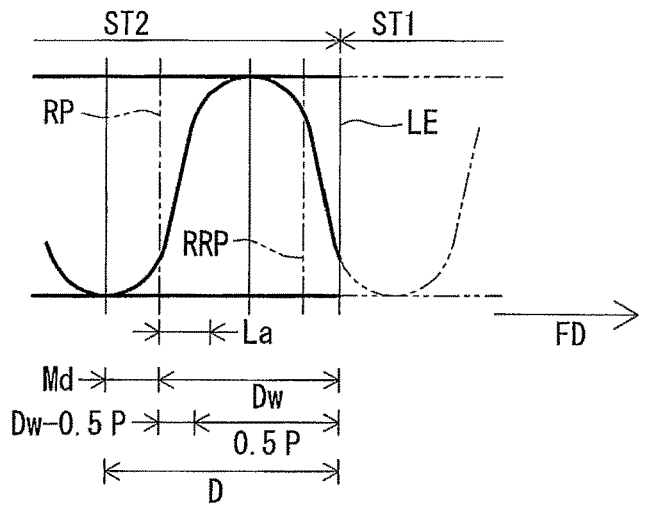
FIG. 25 is an explanatory diagram illustrating a cut section LE obtained under selection of the half-pitch cutting mode, wherein the subtracted value (Dw−0.5P) is equal to or less than the dimensional error allowable value La.

In the example illustrated in FIG. 25, in the SC2W, the positional offset amount Dw is determined to be not less than one-half of the flute pitch P (SC2W: NO), and the processing in the SC9W is performed. In the SC9W, the value (Dw−0.5P) obtained by subtracting one-half of the flute pitch P from the positional offset amount Dw is derived, and it is determined whether or not the subtracted value is equal to or greater than the cutting error allowable value La. The subtracted value (Dw−0.5P) is determined to be neither equal to nor greater than the cutting error allowable value La (SC9W: NO), and the routine proceeds to SC10. In the SC10, it is determined whether or not the correction flag Zb is "1". At this moment, the correction flag Zb is set to "1" in the SA1. Thus, the routine proceeds to the SC11W. In the SC11, a value [(Dw−0.5P)×Va] obtained by multiplying the subtracted value (Dw−0.5P) by the correction value Va is derived, and a value obtained by adding the derived value [(Dw−0.5P)×Va] to the preset order-specified sheet length L is set as a directive sheet length Ln. The lower-level management device 100 gives an instruction to designate this directive sheet length Ln, as a directive sheet length Ln for the third-downstreammost sheet ST3, to the cutter control device 110. Further, the correction flag Zb is set to "0". According to the processing in the SC11W, the directive sheet length Ln for the third-downstreammost sheet is adjustably set in such a manner as to allow a cut section LE located at a presumptive leading edge of the fourth-downstreammost sheet to come closer to the position RRP located upstream of the cut section LE.

Figure 22:
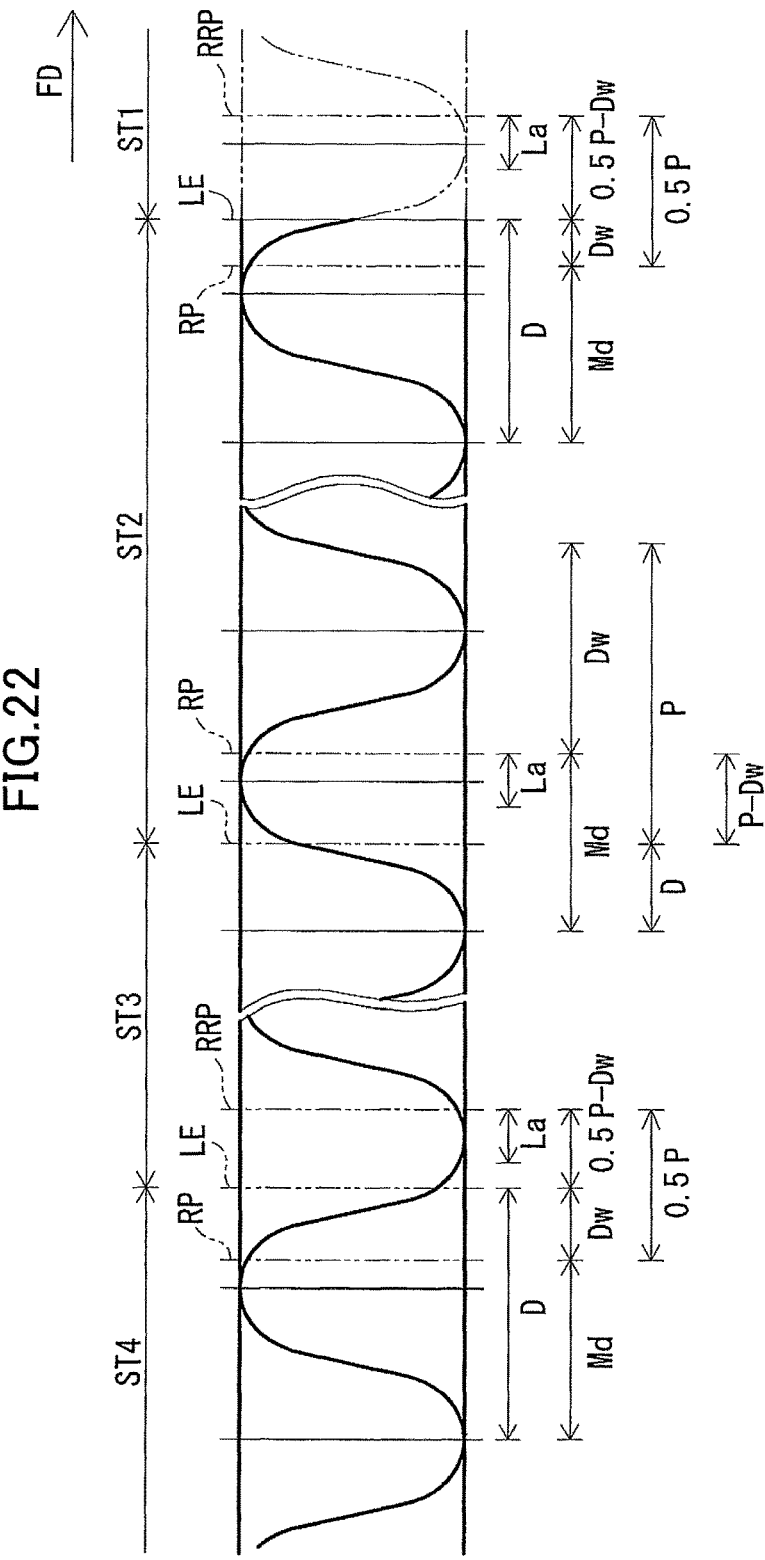
FIG. 22 is an explanatory diagram illustrating a relationship between a subtracted value (0.5P−Dw) or (P−Dw) and the dimensional error allowable value La, in each leading end portion of sheets ST2 to ST4 under selection of the half-pitch cutting mode.

The following description will be made on an assumption that, in the SA9, a cut section which is a leading edge of the third-downstreammost sheet illustrated in FIG. 22 is imaged. After completion of the processing in the SA9, the positional offset amount D is detected in the SA10. In SA11, the positional offset amount Dw is calculated. The positional offset amount Dw is a value (D+P−Md) obtained by subtracting the cut deviation amount Md from a total value of the positional offset amount D and the flute pitch P. The half-pitch cutting mode is selected in the SA6, and the cut phase flag Bt is set to "1" when the directive sheet length Ln for the third-downstreammost sheet ST3 is set. Thus, the processing illustrated in FIG. 15 is performed. Regarding the third-downstreammost sheet ST3 illustrated in FIG. 22, in the SB2W, the positional offset amount Dw is determined to be not less than one-half of the flute pitch P (SB2W: NO), and then, in the SB8W, the subtracted value (P−Dw) is determined to be equal to or less than the cutting error allowable value La (SB8W: NO). Thus, a processing in the SB10 is performed. In the SB10, a value obtained by subtracting one-half of the cutting error allowable value La from the preset order-specified sheet length L is set as a directive sheet length Ln. The lower-level management device 100 gives an instruction to designate this directive sheet length Ln as a directive sheet length Ln for the fourth-downstreammost sheet ST3, to the cutter control device 110. Further, the correction flag Zb is set to "1". According to the processing in the SB10, the directive sheet length Ln for the fourth-downstreammost sheet is adjustably set in such a manner as to allow a cut section LE located at a presumptive leading edge of a fifth-downstreammost sheet to come closer to the reference position RP located downstream of the cut section LE.

In this embodiment, for the preset order-specified sheet length L: 602 mm, the half-pitch cutting mode is selected. Thus, a directive sheet length Ln for an even number-th downstreammost sheet such as a fourth-downstreammost sheet is adjustably set in such a manner as to allow a cut section LE located at a presumptive leading edge of the subsequent odd number-th downstreammost sheet to come closer to the reference position RP located upstream or downstream of the cut section LE, according to the processings in the SB2W to SB12. Further, a directive sheet length Ln for an odd number-th downstreammost sheet such as a fifth-downstreammost sheet is adjustably set in such a manner as to allow a cut section LE located at a presumptive leading edge of the subsequent even number-th downstreammost sheet to come closer to the position RRP located upstream or downstream of the cut section LE, according to the processings in the SC1 to SC14.

<<Advantageous Effects of Second Embodiment>>

In the second embodiment, the cut deviation amount Md is expressed by the following formula: Md=P−mod (Lk, P), i.e., a value obtained by subtracting a remainder as a result of dividing the edge-to-crease line distance Lk by the flute pitch P, from the flute pitch P. A directive sheet length Ln is adjustably set in such a manner as to allow a cut section LE of each corrugated paperboard sheet to come closer to the reference position RP located upstream or downstream of the cut section LE, or the position RRP away from the reference position RP by one-half of the flute pitch P. Thus, a flute trough can be located at a position away from an edge of each corrugated paperboard sheet by the edge-to-crease line distance Lk to allow a creaser unit of a corrugated paperboard box making machine to form a crease line in the flute trough. This makes it possible to enhance accuracy in bending of a corrugated paperboard sheet.

Third Embodiment

With reference to the drawings, the present invention will further be described based on a cutoff system 1 according to a second embodiment thereof. The third embodiment is different from the first embodiment in that a camera is fixed at a given position upstream of an installation position of upper and lower knife cylinders 13, 14 in a conveyance direction FD. In the following description about the third embodiment, the same element or component as that in the first embodiment is assigned with the same reference numeral or mark.

<<General Configuration and Electrical Configuration>>

FIG. 26 is an explanatory diagram illustrating a relationship between a camera CA and a set of upper and lower knife cylinders 13, 14 in a cutoff system according to a third embodiment of the present invention, in terms of installation position. The camera CA is fixed to a rightwardly-extending extension portion of a rear support frame 12 at a position upstream of an installation position of the upper and lower knife cylinders 13, 14 in a conveyance direction FD. More specifically, the camera CA is disposed at a position away from each rotational center of the upper and lower knife cylinders 13, 14 by a distance Lc. The distance Lc is a given value less than a minimum directive sheet length cuttable by the cutoff system 1. However, the distance Lc is required to provide a time enough to set a directive sheet length Ln and give an instruction to designate the directive sheet length Ln, to a cutter control device 110, within a period of time after the camera CA images a presumptive cut position to be cut by the upper and lower knife cylinders 13, 14, through until the upper and lower knife cylinders 13, 14 actually cut a corrugated paperboard at the presumptive cut position.

An electrical configuration of the third embodiment is approximately the same as that of the first embodiment illustrated in FIG. 2, except a part of a directive sheet length setting routine stored in a program memory 120. Specifically, the directive sheet length setting routine in the third embodiment is different from the first embodiment, in terms of the SA9 illustrated in FIG. 3. In the third embodiment, a lower-level management device 100 is configured to, in the SA9, instruct the camera CA to perform an imaging operation, when a measurement roll 22 and a pulse encoder PE2 measure a fact that a corrugated paperboard is conveyed a distance obtained by subtracting the distance Lc from a preset order-specified sheet length L, after detection of the completion of previous cutting in the SA8. The camera CA is operable to image a region around a presumptive cut position for a next sheet, from a lateral side of a conveyance path, and supply an image indicative of a flute arrangement state around the presumptive cut position, to the lower-level management device 100. In the SA10, based on the received image indicative of the flute arrangement state around the presumptive cut position, the lower-level management device 100 is operable to detect a positional, offset amount D. The positional offset amount D means a distance from a nearest one of the flute troughs located upstream with respect to the presumptive cut position, to the presumptive cut position.

<<Operation and Functions of Third Embodiment>>

An operation and functions of the processing in the SA9 in the third embodiment will be described. For example, when a directive sheet length Ln for a second-downstreammost sheet is set in the SA7, and completion of a cutting operation for a downstreammost sheet is detected in the SA8, the camera CA is instructed to image a region around the presumptive cut position, i.e., a leading edge region of a third-downstreammost sheet. In the SA10, the positional offset amount D in the region around the presumptive cut position of the third-downstreammost sheet is detected.

In the third embodiment, when any of the SB5 to SB7 and SB10 to SB11, or any of the SC6 to SC8 and SC11 to SC13 is performed, a directive sheet length Ln is set with reference to the positional offset amount D in the region around the presumptive cut position of the third-downstreammost sheet. The lower-level management device 100 gives an instruction to designate this directive sheet length Ln as a directive sheet length Ln for the third-downstreammost sheet, to the cutter control device 110. Based on the setting of the directive sheet length Ln, the directive sheet length Ln for the third-downstreammost sheet is adjustably set in such a manner as to allow a presumptive cut position located at a leading edge of the fourth-downstreammost sheet to come closer to a nearest one of the flute ridges or flute troughs located upstream or downstream with respect to the presumptive cut position. In regard to the processings illustrated in FIGS. 4 and 5, the directive sheet length setting routine in the third embodiment is the same as that in the first embodiment, and its description will be omitted.

<<Advantageous Effects of Third Embodiment>>

In the third embodiment, a flute arrangement state in a region around a presumptive cut position of an nth (e.g., third) downstreammost sheet is imaged, and the positional offset amount D in the region around the presumptive cut position of the third downstreammost sheet is detected. One of the SB5 to SB7 and SB10 to SB11 or one of the SC6 to SC8 and SC11 to SC13 can set a directive sheet length Ln with reference to the positional offset amount D in the region around the presumptive cut position of the third-downstreammost sheet. Thus, the positional offset amount D at the presumptive cut position, i.e., a leading edge of each corrugated paperboard sheet, can be directly reflected on a directive sheet length Ln for the corrugated paperboard sheet.

[Correspondence Relationship Between Elements in Appended Claims and Embodiments]

A combination of the knife cylinders 13, 14, the knives 20, 21, the motor 15, the motor drive device 150 and the cutter control device 110 is one example of "cutter apparatus" set forth in the appended claims. A combination of the lower-level management device 100 equipped with the program memory 120, etc., and the camera CA is one example of "corrugated paperboard cutting control apparatus" set forth in the appended claims. Each of the camera CA and the imaging operation is one example of a respective one of "detection section" and "detection step" set forth in the appended claims. The lower-level management device 100 equipped with the program memory 120, etc., is one example of "managerial control section" set forth in the appended claims. The processing for detection of the positional offset amount D in the SA10 is one example of "phase determination processing" and "phase determination step" set forth in the appended claims. The processings in the SB2 to SB12 and the processings in the SC1 to SC14 illustrated in FIGS. 4 and 5 are one example of "directive sheet length setting processing" and "directive sheet length setting step" set forth in the appended claims, and one example of "first determination processing" and "second determination processing" set forth in the appended claims. The processings in the SA11, SB2W to SB12 and the processings in the SC1 to SC14 illustrated in FIGS. 14 to 16 are one example of "directive sheet length setting processing" and "directive sheet length setting step" set forth in the appended claims, and one example of "first determination processing" and "second determination processing" set forth in the appended claims. The processings in the SB5 to SB7 and the processings in the SB10 to SB 12 illustrated in FIGS. 4 and 5 are one example of "instruction processing" and "instructing step" set forth in the appended claims. The processings in the SB5 to SB7 and SB10 to SB12 and the processings in the SC6 to SC8 illustrated in FIGS. 15 and 16 are one example of "instruction processing" and "instructing step" set forth in the appended claims. The processings in the SA3 to SA6 illustrated in FIGS. 3 and 14 are one example of "mode setting processing" set forth in the appended claims, and the processings in the SA4 and SA6 illustrated in FIGS. 3 and 14 are one example of "first setting processing" and "second setting processing" set forth in the appended claims. The processing for determination on NO illustrated in FIGS. 3 and 14 is one example of "third setting processing" set forth in the appended claims.

MODIFICATION

While the present invention has been described based on the embodiments thereof, it is obvious to those skilled in the art that various changes and modifications may be made therein without departing from the spirit and scope thereof as set forth in appended claims.

(1) In the first to third embodiments, the lower-level management device 100 and the cutter control device 110 are formed as separate units. Alternatively, they are formed as a single control unit configured to execute the directive sheet length setting routine and control the motor speed of the motor 15.

(2) In the first and second embodiments, the camera CA is configured to image a cut section LE which is a leading edge of a corrugated paperboard PB after being subjected to cutting using the knives 20, 21. However, the present invention is not limited thereto. For example, in the second embodiment, the camera CA may be configured to image a region around a presumptive cut position of a corrugated paperboard PB before being subjected to cutting using the knives 20, 21, as in the third embodiment.

(3) In the first to third embodiments, in the SA10, the positional offset amount is detected as a distance from a nearest one of the flute troughs located upstream with respect to a cut section LE or a presumptive cut position, to the cut section LE or the presumptive cut position. However, the present invention is not limited thereto. For example, the positional offset amount is may be a distance measures on the basis of a nearest one of the flute ridges located upstream with respect to a cut section LE or a presumptive cut position, or a given position such as an intermediate position between adjacent flute ridge and trough.

(4) In the first to third embodiments, after start of an order, a cut section LE which is a leading edge of a second-downstreammost sheet, or a region around a presumptive cut position which is a leading edge of a third-downstreammost sheet, is imaged. However, the present invention is not limited thereto. For example, before or immediately after start of an order, a region around a leading edge of a downstreammost sheet may be imaged to detect the positional offset amount D. In this modification, the positional offset amount D concerning the leading edge of the downstreammost sheet is used as a reference to adjustably set a coordinated directive sheet length Ln for a second-downstreammost sheet.

(5) In the second embodiment, the lower-level management device 100 is configured to receive an order-specified cut deviation amount Md, as one of various control instruction information delivered from the upper-level management device 200 and temporarily store the received order-specified cut deviation amount Md in the working memory 130. However, the present invention is not limited thereto. For example, the lower-level management device 100 may be configured to receive an order-specified edge-to-crease line distance Lk, as one of various control instruction information delivered from the upper-level management device 200 to calculate a cut deviation amount Md according to the following calculation formula: Md=P−mod (Lk, P), and temporarily store the calculated cut deviation amount Md in the working memory 130.

(6) In the second embodiment, as regards a distance corresponding to a preset reference flute arrangement phase, when the processings in SB2W to SB12 illustrated in FIG. 15 are performed, the reference position RP is used as an original (zero) point, so that a distance from a nearest one of the flute troughs located upstream with respect to the cut section LE is set as the cut deviation amount Md. On the other hand, when the processings in SC1 to SC14 illustrated in FIG. 16 are performed, the position RRP is used as an original (zero) point, so that a distance from the nearest trough is set as a total value of the cut deviation amount Md and one-half of the flute pitch P. Then, as illustrated in FIG. 18, the cut deviation amount Md is set to a value obtained by subtracting [mod (Lk, P)], i.e., a distance extending from an upstream edge of a downstreammost sheet ST1 to the nearest trough in the conveyance direction, from the flute pitch P. However, the cut deviation amount Md is not limited to the setting in the second embodiment. For example, in FIG. 17, a distance from an upstream edge to the nearest trough of a downstreammost sheet ST1 is set in such a manner as to allow each of a crease line K1 adjacent to the upstream edge of the downstreammost sheet ST1 and a crease K2 adjacent to a downstream-side joint of the downstreammost sheet ST1 to be located possibly close to a flute trough. Then, a value obtained by subtracting this distance from the flute pitch P may be set as the cut deviation amount Md.

What is claimed is:

1. A corrugated paperboard cutting control apparatus for instructing a cutting apparatus to perform a cutting operation based on a directive sheet length, wherein the corrugated paperboard comprises a corrugated medium with flutes formed at given flute pitches to have flute ridges and troughs, and when the corrugated paperboard is conveyed in a conveyance direction crossing a direction along which each of the flute ridges or troughs extends, the cutting apparatus is operable to cut the corrugated paperboard in a direction perpendicular to the conveyance direction, the corrugated paperboard cutting control apparatus comprising:
a detection section configured to detect a flute arrangement state at an actual cut position of the corrugated paperboard cut by the cutting apparatus, or a presumptive cut position of the corrugated paperboard to be cut by the cutting apparatus; and
a managerial control section configured to acquire a result of the detection in the detection section,
wherein the managerial control section is operable:
to select one of a plurality of modes comprising at least a first mode of setting the directive sheet length to a value of an integral multiple of the flute pitch, and a second mode of setting the directive sheet length to a value of an integral multiple of one-half of the flute pitch, according to (i) a first comparison result between a remainder as a result of dividing the preset order-specified sheet length by the flute pitch or a value obtained by subtracting the remainder from the flute pitch, and a dimensional error allowable value of a corrugated paperboard sheet determined based on a flute type, and (ii) a second comparison result between an absolute value of a value obtained by subtracting the remainder from one-half of the flute pitch, and the dimensional error allowable value;
to determine a flute arrangement phase in one flute pitch of the corrugated paper board to be located at the actual cut position or the presumptive cut position, based on the detection result in the detection section;

to adjust a preset order-specified sheet length in such a manner as to allow the determined flute arrangement phase to come closer to a preset reference flute arrangement phase, to thereby set a directive sheet length having a value equal to an integral multiple of the flute pitch or an integral multiple of one-half of the flute pitch, according to the selected mode; and to give an instruction to designate the directive sheet length to the cutting apparatus.

2. The corrugated paperboard cutting control apparatus according to claim 1, wherein the managerial control section is capable of, in addition to the first and second modes, selecting a third mode of setting the preset order-specified sheet length as the directive sheet length, and wherein the managerial control section is operable, according to the first comparison result and the second comparison result, to select one of the first to third modes.

3. The corrugated paperboard cutting control apparatus according to claim 2, wherein, during selection of one of the first to third mode, the managerial control section is operable:

when it is determined that the remainder as the result of dividing the preset order-specified sheet length by the flute pitch or the value obtained by subtracting the remainder from the flute pitch is equal to or less than the dimensional error allowable value, to select the first mode;

when it is determined that the absolute value of the value obtained by subtracting the remainder from one-half of the flute pitch is equal to or less than the dimensional error allowable value, to select the second mode; and when it is determined that the remainder as the result of dividing the preset order-specified sheet length by the flute pitch or the value obtained by subtracting the remainder from the flute pitch is greater than the dimensional error allowable value and further the absolute value of the value obtained by subtracting the remainder from one-half of the flute pitch is greater than the dimensional error allowable value, to select the third mode.

4. The corrugated paperboard cutting control apparatus according to claim 1, wherein, during setting of the directive sheet length, the managerial control section is operable:

when the first mode is selected, to adjust the preset order-specified sheet length in such a manner as to allow the determined flute arrangement phase to come closer to the preset reference flute arrangement phase, to thereby set a directive sheet length having a value equal to an integral multiple of the flute pitch;

when the second mode is selected, to adjust the preset order-specified sheet length in such a manner as to allow the determined flute arrangement phase to come closer to each of the preset reference flute arrangement phase and a phase offset from the preset reference flute arrangement phase by one-half of the flute pitch, which are alternately switched therebetween during repetition of the directive sheet length setting operation, to thereby set a directive sheet length having a value equal to an integral multiple of one-half of the flute pitch.

5. The corrugated paperboard cutting control apparatus according to claim 4, wherein when a crease line is formed in a corrugated paperboard sheet along flute troughs thereof, the reference flute arrangement phase is preliminarily set according to a distance from an edge of a corrugated paperboard sheet to a nearest trough in the conveyance direction.

6. The corrugated paperboard cutting control apparatus according to claim 4, wherein the reference flute arrangement phase is a phase where the flute ridge or trough is located, within one flute pitch.

7. The corrugated paperboard cutting control apparatus according to claim 1, wherein the managerial control section is operable, when the first mode or the second mode is selected, to compare a conveyance-directional distance equivalent to a difference between the determined flute arrangement phase or a phase obtained by adding one flute pitch to the determined flute arrangement phase, and the preset reference flute arrangement phase, to the value of one-half of the flute pitch, and, according to a result of the comparison, to perform an adjustment of increasing the preset order-specified sheet length, or an adjustment of reducing the preset order-specified sheet length.

8. The corrugated paperboard cutting control apparatus according to claim 7, wherein, in a situation where the first mode is selected, the managerial control section is operable, when the conveyance-directional distance equivalent to the difference between the determined flute arrangement phase or the phase obtained by adding one flute pitch to the determined flute arrangement phase, and the preset reference flute arrangement phase, is less than the value of one-half of the flute pitch, to perform a first increasing adjustment of increasing the preset order-specified sheet length, and, when the conveyance-directional distance equivalent to the difference is equal to or greater than the value of one-half of the flute pitch, to perform a first reducing adjustment of reducing the preset order-specified sheet length.

9. The corrugated paperboard cutting control apparatus according to claim 8, wherein, in a situation where the second mode is selected, the managerial control section is operable, when the conveyance-directional distance equivalent to the difference between the determined flute arrangement phase or the phase obtained by adding one flute pitch to the determined flute arrangement phase, and the preset reference flute arrangement phase, is less than the value of one-half of the flute pitch, to alternately perform, during repetition of the directive sheet length setting operation, the first increasing adjustment of increasing the preset order-specified sheet length, or a second reducing adjustment of reducing the preset order-specified sheet length in a different manner from the first reducing adjustment, and, when the conveyance-directional distance equivalent to the difference is equal to or greater than the value of one-half of the flute pitch, to alternately perform, during repetition of the directive sheet length setting operation, the first reducing adjustment of reducing the preset order-specified sheet length, or a second increasing adjustment of increasing the preset order-specified sheet length in a different manner from the first increasing adjustment.

10. A corrugated paperboard cutting control method for instructing a cutting apparatus to perform a cutting operation based on a directive sheet length, wherein the corrugated paperboard comprises a corrugated medium with flutes formed at given flute pitches to have flute ridges and troughs, and the cutting apparatus is operable, when the corrugated paperboard is conveyed in a conveyance direction crossing a direction along which each of the flute ridges or troughs extends, to cut the corrugated paperboard in a direction perpendicular to the conveyance direction, the corrugated paperboard cutting control method comprising:

a selection step of selecting one of a plurality of modes comprising at least a first mode of setting the directive sheet length to a value of an integral multiple of the flute pitch, and a second mode of setting the directive sheet length to a value of an integral multiple of one-half of the flute pitch, according to (i) a first comparison result between a remainder as a result of dividing the preset order-specified sheet length by the flute pitch or a value obtained by subtracting the remainder from the flute pitch, and a dimensional error allowable value of a corrugated paperboard sheet determined based on a flute type, and (ii) a second comparison result between an absolute value of a value obtained by subtracting the remainder from one-half of the flute pitch, and the dimensional error allowable value;

a detection step of detecting a flute arrangement state at an actual cut position of the corrugated paperboard cut by the cutting apparatus, or a presumptive cut position of the corrugated paperboard to be cut by the cutting apparatus;

a phase determination step of, based on a result of the detection in the detection step, determining a flute arrangement phase in one flute pitch of the corrugated paper board to be located at the actual cut position or the presumptive cut position;

a directive sheet length setting step of adjusting a preset order-specified sheet length in such a manner as to allow the flute arrangement phase determined in the phase determination step to come closer to a preset reference flute arrangement phase, to thereby set a directive sheet length having a value equal to an integral multiple of the flute pitch or an integral multiple of one-half of the flute pitch, according to the mode selected in the selection step; and an instructing step of giving an instruction to designate the directive sheet length set in the directive sheet length setting step, to the cutting apparatus.

* * * * *